United States Patent
Takao et al.

(10) Patent No.: US 7,110,327 B2
(45) Date of Patent: Sep. 19, 2006

(54) MAGNETO-OPTICAL RECORDING AND REPRODUCING METHOD, USING REPRODUCING LAYER WITH HIGH SATURATION MAGNETIZATION

(75) Inventors: Hiroki Takao, Kitasouma-gun (JP); Yuji Yamazaki, Toride (JP); Susumu Imai, Toride (JP); Hiroyuki Awano, Noda (JP); Katsusuke Shimazaki, Toride (JP)

(73) Assignee: Hitachi Maxell, Ltd., Osaka (JP)

( * ) Notice: Subject to any disclaimer, the term of this patent is extended or adjusted under 35 U.S.C. 154(b) by 247 days.

(21) Appl. No.: 10/200,289

(22) Filed: Jul. 23, 2002

(65) Prior Publication Data
US 2002/0181337 A1    Dec. 5, 2002

Related U.S. Application Data

(62) Division of application No. 09/433,020, filed on Nov. 3, 1999, now Pat. No. 6,455,174.

(30) Foreign Application Priority Data

Nov. 5, 1998   (JP)   ............... 10-328788

(51) Int. Cl.
 *G11B 11/00* (2006.01)
 *G11B 5/66* (2006.01)
(52) U.S. Cl. .................... 369/13.14; 369/13.17; 428/632
(58) Field of Classification Search ............. 369/13.14, 369/13.17, 13.22, 13.32; 428/632; G11B 11/00, G11B 5/66
See application file for complete search history.

(56) References Cited

U.S. PATENT DOCUMENTS

| 4,210,946 A | * | 7/1980 | Iwasaki et al. ............. 360/131 |
| 4,423,450 A | * | 12/1983 | Hamilton .................... 360/111 |
| 4,731,157 A | * | 3/1988 | Lazzari ........................ 216/22 |
| 5,202,862 A | * | 4/1993 | Ohta et al. ............... 369/13.17 |
| 5,233,578 A | * | 8/1993 | Yamamoto et al. ....... 369/13.41 |
| 5,265,074 A | * | 11/1993 | Ohta et al. ............... 369/13.41 |
| 5,757,734 A | * | 5/1998 | Nakajima et al. ........ 369/13.15 |

(Continued)

FOREIGN PATENT DOCUMENTS

| WO | WO/99/08262 | * | 2/1999 |
| WO | WO99/24978 | * | 5/1999 |

OTHER PUBLICATIONS

S Iwasaki et al., "Perpendicular Magnetic Recording With a Composite Anisotropy Film," *IEEE Transactions on Magnetics*, vol. Mag.- 15, No. 6, pp. 1456-1458 (1979).

*Primary Examiner*—A M Psitos
(74) *Attorney, Agent, or Firm*—Oliff & Berridge, PLC

(57) ABSTRACT

A magnetic recording medium comprises, on a substrate, a recording auxiliary layer, a recording holding layer, recording control layer, and a recording layer. The recording layer is constructed by using a ferri-magnetic material having perpendicular magnetization. The data can be recorded at a super high density by using the recording and reproducing head of the present invention, because the recording layer has the perpendicular magnetization. The disappearance of data, which would be otherwise caused by the thermomagnetic relaxation phenomenon, is suppressed after recording the data, because the recording layer has large coercive force at the room temperature. The data, which is recorded at the super high density on the magnetic recording medium, can be reproduced by using a magnetic resistance element carried on the recording and reproducing head.

19 Claims, 27 Drawing Sheets

U.S. PATENT DOCUMENTS

| | | | | |
|---|---|---|---|---|
| 5,889,641 A | * | 3/1999 | Belser et al. | 360/113 |
| 5,942,342 A | * | 8/1999 | Hikosaka et al. | 428/694 R |
| 5,959,942 A | * | 9/1999 | Taguchi et al. | 369/13 |
| 5,965,285 A | * | 10/1999 | Mihara et al. | 428/694 ML |
| 5,966,347 A | * | 10/1999 | Fukada | 369/13.29 |
| 5,986,978 A | * | 11/1999 | Rottmayer et al. | 369/13.17 |
| 6,011,664 A | * | 1/2000 | Kryder et al. | 360/59 |
| 6,016,290 A | * | 1/2000 | Chen et al. | 369/13.17 |
| 6,139,980 A | | 10/2000 | Matsumoto | 428/692 |
| 6,248,439 B1 | * | 6/2001 | Tamanoi et al. | 428/332 |
| 6,317,280 B1 | * | 11/2001 | Nakajima et al. | 360/59 |
| 6,327,227 B1 | * | 12/2001 | Katayama | 369/13.17 |
| 6,333,899 B1 | * | 12/2001 | Tamanoi et al. | 369/13.43 |
| 6,400,654 B1 | * | 6/2002 | Sawamura et al. | 369/13.14 |
| 6,483,664 B1 | * | 11/2002 | Kamijima | 360/126 |
| 6,532,125 B1 | * | 3/2003 | Hamann et al. | 360/59 |

* cited by examiner

2: RECORDING AUXILIARY LAYER
3: RECORDING HOLDING LAYER
4: RECORDING CONTROL LAYER
5: RECORDING LAYER

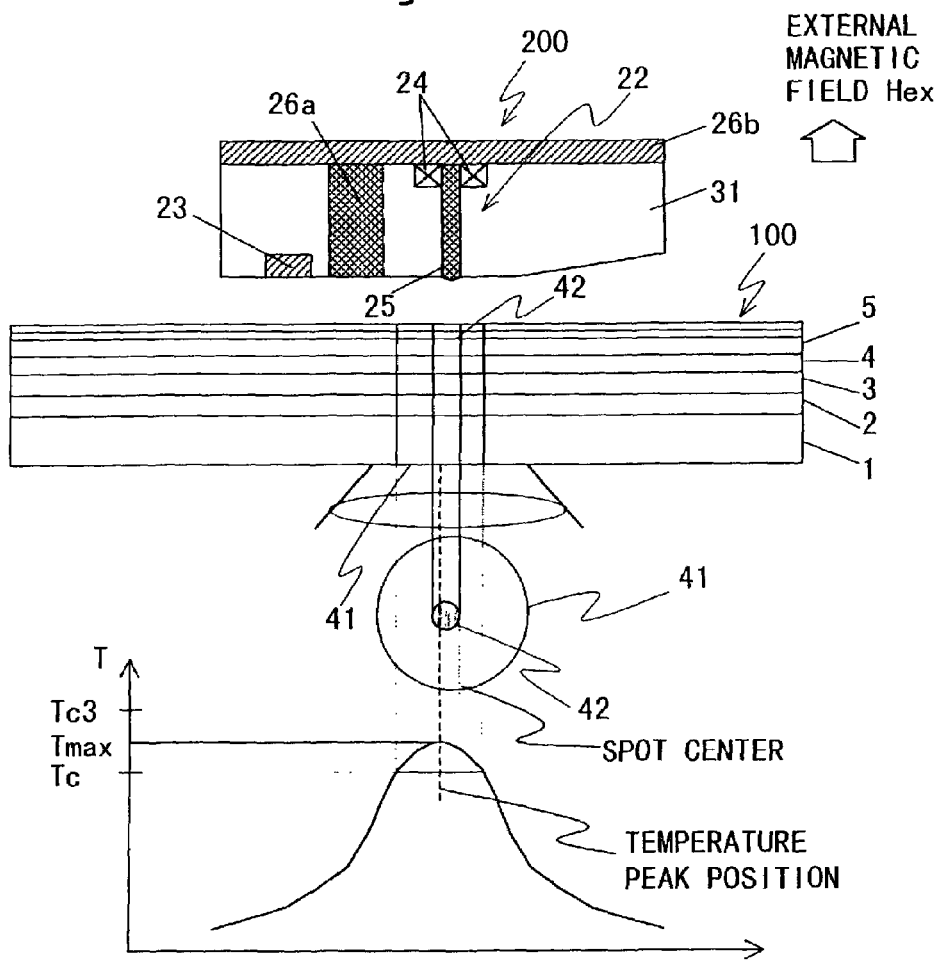
Fig. 5A
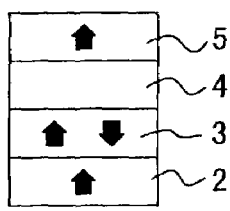 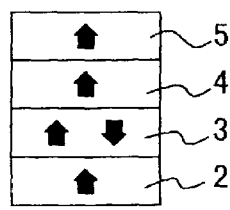
Fig. 5B

2: RECORDING AUXILIARY LAYER
3: RECORDING HOLDING LAYER
4: RECORDING CONTROL LAYER
5: RECORDING LAYER
8: REPRODUCING LAYER

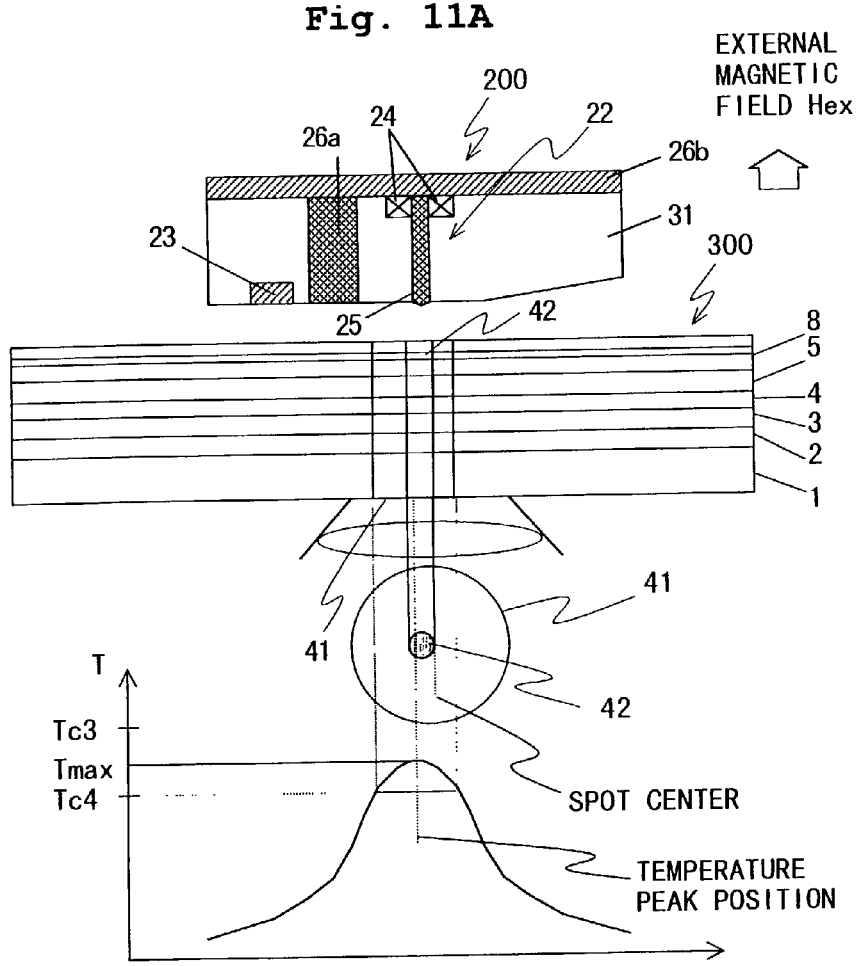
Fig. 11A
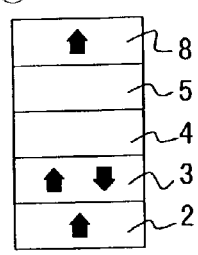 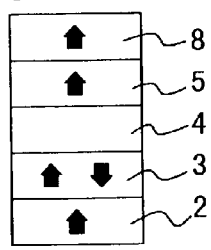 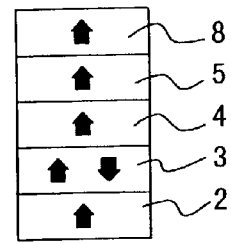
Fig. 11B

3: RECORDING HOLDING LAYER
4: RECORDING CONTROL LAYER
5: RECORDING LAYER
50: REPRODUCING LAYER

Fig. 14A
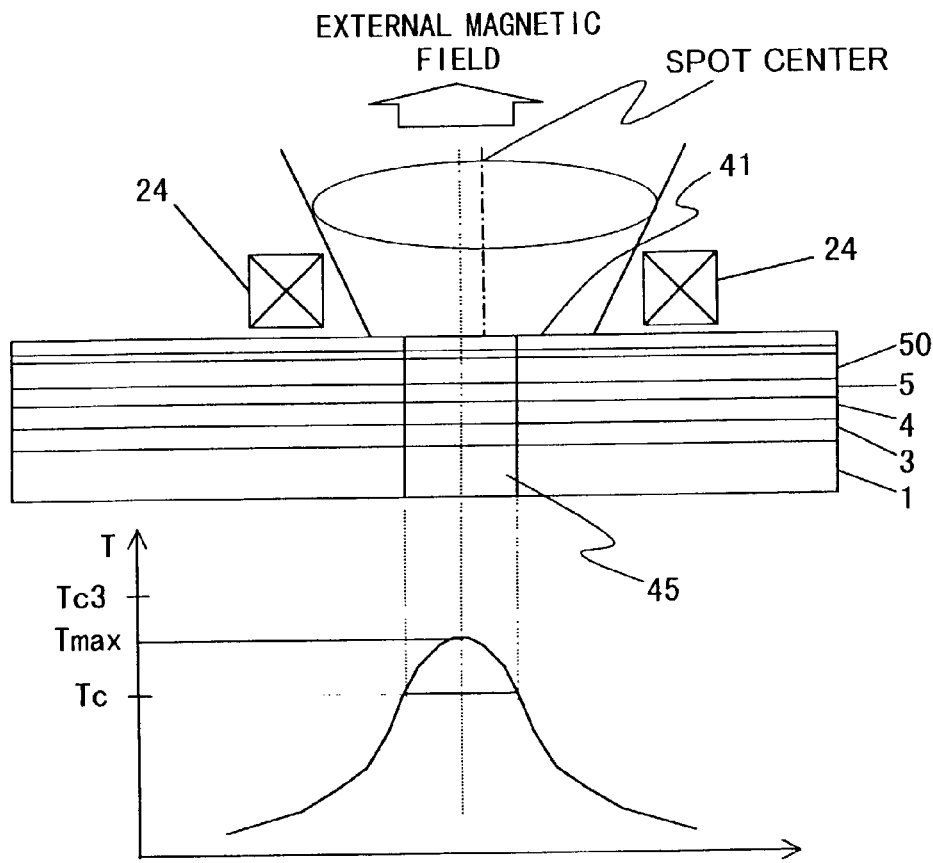
Fig. 14B
① Tc4<T<Tc
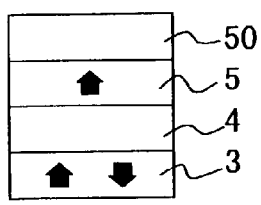
② Tc2<T<Tc4
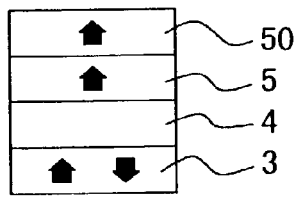
③ Tcr4<T<Tc2
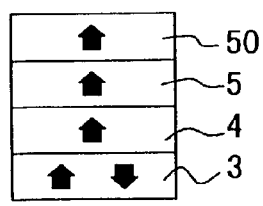
④ ROOM TEMPERATURE<T<Tcr4
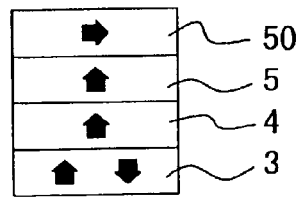
⬆ ARROWS INDICATE
TRANSITION METAL
MAGNETIZATION 3: RECORDING HOLDING LAYER
4: RECORDING CONTROL LAYER
5: RECORDING LAYER
52: MASK LAYER
54: MAGNETIC TRANSFER LAYER

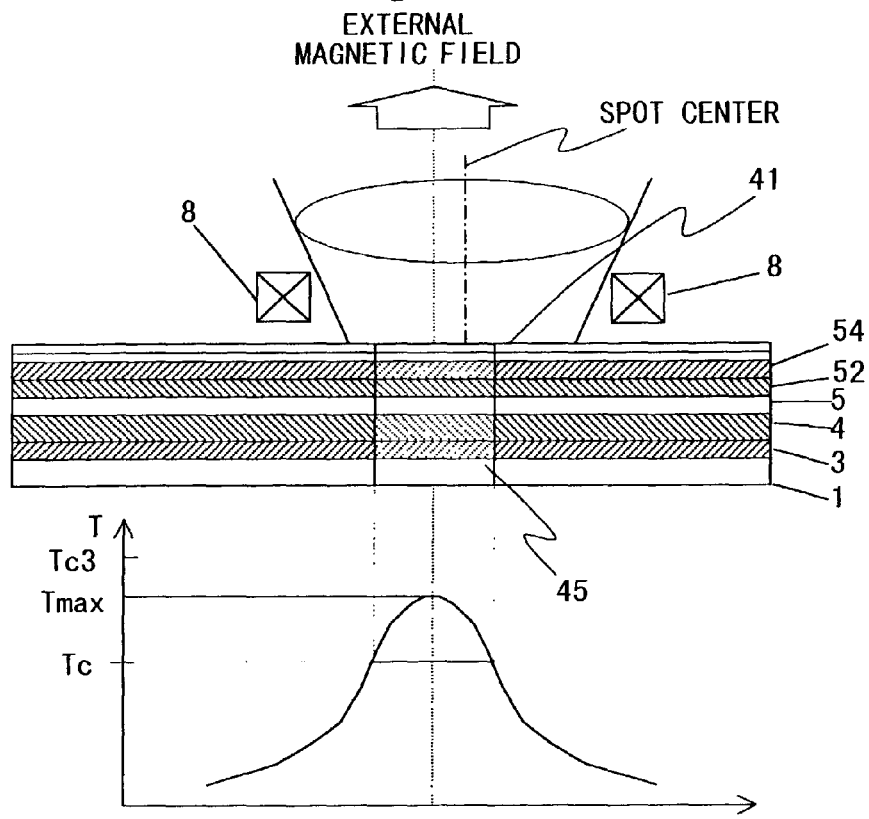
Fig. 17A
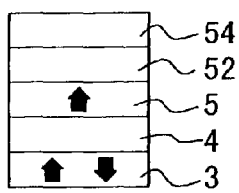
① Tc4<T<Tc
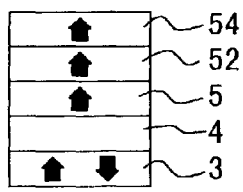
② Tc2<T<Tc4
▲ ARROWS INDICATE TRANSITION METAL MAGNETIZATION
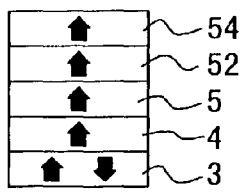
③ Tcr4<T<Tc2
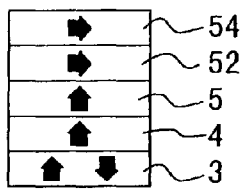
④ Tcr'5<T<Tcr4
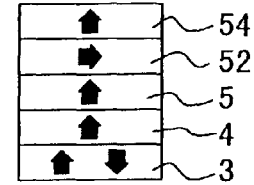
⑤ ROOM TEMPERATURE <T<Tcr'5
Fig. 17B 231: SUBSTRATE
232: PROTECTIVE LAYER
233: MEMORY LAYER
234: SWITCHING LAYER
235: DISPLACEMENT LAYER
236: PROTECTIVE LAYER
237: LUBRICANT LAYER

Fig. 28
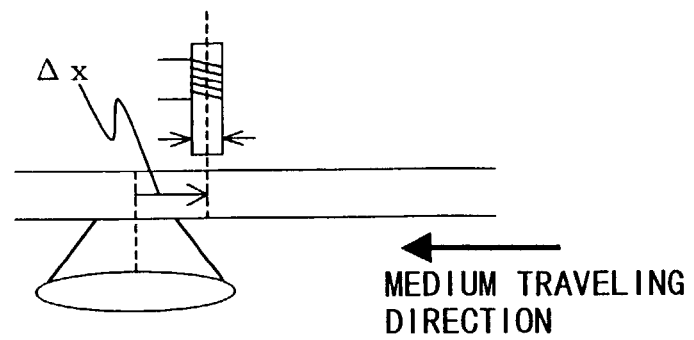
MEDIUM TRAVELING DIRECTION
GHOST SIGNAL
$\Delta x = -0.2 \mu m$
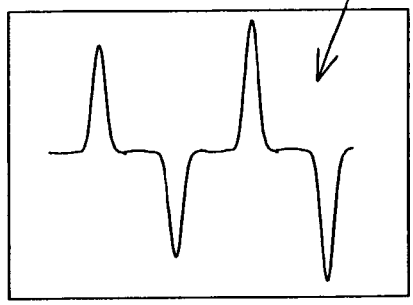
$\Delta x = 0.1 \mu m$
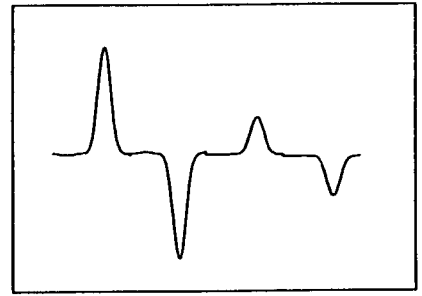
$\Delta x = -0.1 \mu m$
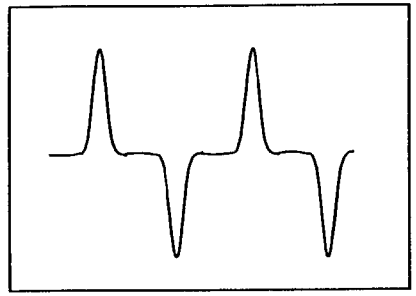
$\Delta x = 0.2 \mu m$
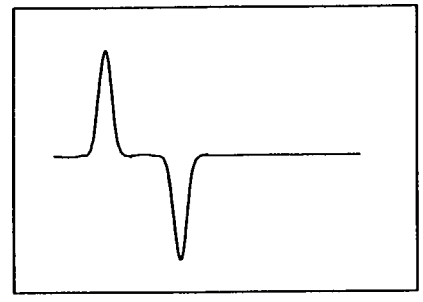
$\Delta x = 0 \mu m$
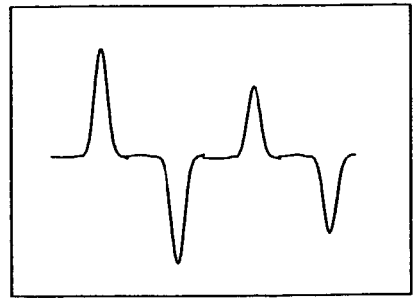
$\Delta x = 0.3 \mu m$
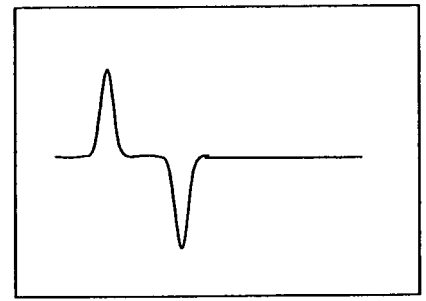

MAGNETO-OPTICAL RECORDING AND REPRODUCING METHOD, USING REPRODUCING LAYER WITH HIGH SATURATION MAGNETIZATION

This is a Division of application Ser. No. 09/433,020 filed Nov. 3, 1999. The entire disclosure of the prior application is hereby incorporated by reference herein in its entirety.

BACKGROUND OF THE INVENTION

1. Field of the Invention

The present invention relates to a magnetic recording medium comprising a magnetic film having perpendicular magnetization, the magnetic film being used for a recording layer. The present invention also relates to a recording and reproducing head and a magnetic recording and reproducing method for such a magnetic recording medium. In particular, the present invention relates to a magnetic recording medium on which any disappearance of data, which would be otherwise caused by the thermomagnetic relaxation phenomenon, is prevented or suppressed, and recording and reproduction can be performed at a surface recording density of not less than 20 Gbits/in$^2$. The present invention also relates to a recording and reproducing head and a novel magnetic recording and reproducing method which are preferably used to perform recording and reproduction on such a magnetic recording medium.

2. Description of the Related Art

The hard disk (magnetic recording medium) is widely used as an external storage medium for computers and the like. Usually, the longitudinal magnetic recording is adopted for the hard disk, in which information is recorded in parallel to a recording film surface by using, for example, a ring-shaped magnetic head (hereinafter referred to as "ring head") carried on a floating type slider.

In recent years, a variety of data including, for example, graphic data, animation data, and document data are processed in various ways in advanced manners, in which a huge amount of information is dealt with. In order to successfully deal with such a huge amount of data, one of the most important technical tasks in the field of hard disk is to increase the surface recording density. At present, the hard disk has achieved a surface recording density of 4 Gbits/in$^2$.

A means for achieving the high density process has been suggested, for example, in *IEEE Transactions on Magnetics*, Vol. MAG-15, No. 6, pp. 1456–1458 (1979). This document describes a perpendicular magnetic recording system and a perpendicular magnetic recording medium which are based on the use of a recording film of a Co—Cr film having perpendicular magnetization so that information is recorded in the perpendicular direction with respect to a recording film surface.

In order to further increase the surface recording density of the hard disk, it is known that the magnet (magnetic particle), which is a recording unit for constructing the recording layer, is allowed to have a small size. However, if the magnetic particles are allowed to have a minute size so that the surface recording density is increased to be not less than 10 to 20 Gbits/in$^2$, the following problem arises. That is, the magnetic particles become unstable due to the thermomagnetic relaxation phenomenon, and the recorded data disappears.

SUMMARY OF THE INVENTION

The present invention has been made in order to solve the problem involved in the conventional technique as described above, an object of which is to provide a magnetic recording medium in which minute magnetic particles successfully exist in a stable manner, and information subjected to fine recording can be reproduced at a high S/N ratio, even when the surface recording density is increased by using the minute magnetic particles to serve as the recording unit.

Another object of the present invention is to provide a recording and reproducing head which is preferably used to record and reproduce information by using the magnetic recording medium as described above.

Still another object of the present invention is to provided a novel magnetic recording and reproducing method in which information is recorded at a super high density by using the magnetic recording medium and the recording and reproducing head as described above, and the recorded information can be reproduced at a high S/N ratio.

According to a first aspect of the present invention, there is provided a magnetic recording medium comprising:

a substrate;

a recording holding layer composed of a magnetic material; and a recording layer composed of a ferri-magnetic material having perpendicular magnetization, wherein:

information is recorded by applying a recording magnetic field while heating a predetermined area of the magnetic recording medium so that a recording magnetic domain in the recording layer is inverted, and the information is reproduced by detecting a magnetic field obtained from the recording magnetic domain in the recording layer.

The magnetic recording medium of the present invention includes the recording layer which is formed of the ferri-magnetic material having the perpendicular magnetization, and the recording holding layer which is formed of the magnetic material. The recording holding layer can be composed of, for example, a ferri-magnetic material and an antiferromagnetic material. The recording holding layer is preferably provided between the substrate and the recording layer. Especially, it is preferable that the recording holding layer is provided so that it makes contact with the recording layer with each other. When the recording holding layer is provided as described above, the recording holding layer makes exchange coupling with the recording magnetic domain of the recording layer to hold the recording magnetic domain in a stable state in the perpendicular direction. Those preferably usable as the ferri-magnetic material for the recording holding layer include, for example, rare earth-transition metal alloys such as TbFeCo, GdTbFeCo, TbFeCoCr, TbFe, GdFeCo, GdTbFe, and DyTbFe. Those preferably usable as the antiferromagnetic material for the recording holding layer include, for example, transition metal (Cr, Mn, Fe, Co, Ni) alloys, alloys of noble metal (Au, Pt, Rh, Pd) and transition metal (Cr, Mn, Fe, Co, Ni), and transition metal oxides. For example, it is preferable to use FeMn, NiO, NiMn, PtMn, FeNiMn, AuMn, ZnZr, and FeRh.

Concerning the magnetic recording medium of the present invention, in order to ensure the thermal stability of the recording magnetic domain in the recording layer, it is necessary that the recording layer has a coercive force of not less than 5 kOe within a temperature range from the room temperature (about 10° C.) which is the preservation temperature for the medium, approximately to the temperature in the apparatus (about 100° C.). Therefore, it is preferable that the recording layer has a coercive force of not less than 5 kOe in a temperature range of 10° C. to 150° C. However, there is no limitation thereto when a reproducing layer is used to increase the magnetic field from the recording layer as described later on. Further, when the information recorded in the recording layer is reproduced, the magnetic field, which is generated from the recording magnetic domain of the recording layer, is detected. Accordingly, it is advantageous to use a recording layer having a high Curie temperature. Therefore, in order to obtain a sufficient magnetic field intensity from the recording magnetic domain at a temperature in the vicinity of the reproducing temperature, it is preferable that the recording layer has a Curie temperature of not less than 300° C.

As described above, when the recording layer having the large coercive force within the temperature range of 10° C. to 150° C. is used, even if the minute recording mark is formed in the recording layer, then the disappearance of the recording mark is suppressed, which would be otherwise caused by the thermomagnetic relaxation phenomenon after the recording. During the recording, the coercive force of the recording layer can be decreased by heating the magnetic recording medium to a temperature of not less than 200° C. Therefore, the recording can be performed with ease by using a weak applied magnetic field. When the recorded information is reproduced, the magnetic field from the recording magnetic domain in the recording layer is directly detected by using, for example, a magnetic resistance element to reproduce the information. In other words, the magnetic recording medium of the present invention is different from the magneto-optical recording medium on which the magnetization state is detected by utilizing the magneto-optical effect (for example, Kerr effect).

The magnetic recording medium of the present invention may further comprise a reproducing layer on the recording layer. It is preferable that the reproducing layer has saturation magnetization which is larger than saturation magnetization of the recording layer at a temperature of not less than the room temperature, preferably in a temperature range of 20° C. to 150° C. That is, the reproducing layer is capable of generating leak magnetic field which is larger than that of the recording layer. Therefore, when the magnetization of the recording layer is transferred to the reproducing layer to detect the magnetization state of the reproducing layer, it is possible to obtain an amplified reproduced signal. The reproducing layer may be either an in-plane magnetizable film or a perpendicularly magnetizable film.

The magnetic recording medium of the present invention may further comprise a recording auxiliary layer which exhibits soft magnetization. Those usable as a material for constructing such a recording auxiliary layer include, for example, permalloy (NiFe), Fe—(Al, Si) alloys, NiFe—(Mo, Cr, Cu, Mn, Rh), Co amorphous alloys. The recording auxiliary layer is preferably formed such that the magnetic field is applied thereto via the recording layer. In other words, when the magnetic field is applied from the side of the substrate, it is possible to provide a structure comprising the, substrate, the recording layer, and the recording auxiliary layer in this order. When the magnetic field is applied from the side opposite to the substrate, it is possible to provide a structure comprising the substrate, the recording auxiliary layer, and the recording layer in this order. When the recording layer and the recording auxiliary layer are stacked in the order as described above, it is also preferable that an arbitrary layer is allowed to intervene between these layers.

In the present invention, it is possible to provide an arbitrary layer in addition to the recording auxiliary layer and the recording holding layer described above. For example, if the recording layer and the recording holding layer make exchange coupling with each other during the recording, it is difficult to perform the recording corresponding to the recording data. Therefore, it is preferable to provide a recording control layer for breaking the exchange coupling between the both layers at a temperature at which the predetermined area of the medium is heated during the recording (the temperature will be hereinafter referred to as "recording temperature" which is in the vicinity of the Curie temperature of the recording layer in the embodiments as described later on). In order to break the exchange coupling at the recording temperature, it is preferable that the Curie temperature of the recording control layer is set to be not more than the Curie temperature of the recording layer. It is also possible that a lubricating layer, which is composed of, for example, Fombline (product name) or silicon, is formed on the surface of the magnetic recording medium. The provision of the lubricating layer makes it possible to allow the recording and reproducing head to smoothly slide on the medium surface, even when the recording and reproducing head contacts with the magnetic recording medium during the recording and reproduction. Therefore, it is possible to mitigate and reduce the friction between the medium and the head.

The magnetic recording medium of the present invention may further include a texture which is provided on the surface of the substrate. The provision of the texture on the surface of the substrate makes it possible to constantly control the floating amount of the floating type head when the floating type head is allowed to float over the medium.

According to a second aspect of the present invention, there is provided a recording method for recording information on a magnetic recording medium having a recording layer on a substrate, the method comprising the step of:

recording the information by applying a magnetic field in which at least one of intensity and polarity is modulated depending on the information to be recorded by using a magnetic head, while applying heat to a predetermined area of the magnetic recording medium, wherein:

the recording layer is composed of a ferri-magnetic material having perpendicular magnetization; and a magnetic pole of the magnetic head has a width of not more than 1 μm in a direction perpendicular to a recording direction.

In the recording method of the present invention, it is possible to use, for example, a laser beam in order to heat the predetermined area on the magnetic recording medium. The heating can be effected by collecting and radiating the laser beam onto the predetermined area on the medium by using an objective lens. Accordingly, the coercive force of the recording layer is decreased at only the predetermined high temperature area on which the laser beam is collected. The magnetization is inverted only in the concerning range of the area. Thus, it is possible to form a minute recording magnetic domain. In order to introduce the laser beam into the objective lens, it is preferable to use an optical fiber. The optical fiber successfully introduces the laser beam from a laser light source into the objective lens with good energy efficiency. Another method is available to heat the predetermined area on the magnetic recording medium, in which a heater such as a coil type heater is used. The area, which is located at a position of not more than 1 μm from the surface of the magnetic recording medium, can be heated by using the radiant heat from the heater.

In the recording method of the present invention, for example, it is possible that a plurality of recording magnetic heads are used to simultaneously record a series of divided pieces of information at a plurality of positions on the magnetic recording medium respectively. Accordingly, it is possible to improve the information transfer speed.

According to a third aspect of the present invention, there is provided a reproducing method for reproducing information recorded on a magnetic recording medium having a recording layer, wherein:

the recording layer is composed of a ferri-magnetic material having perpendicular magnetization; and a magnetic element, which is selected from the group consisting of a magnetic resistance element, a magnetic element having a spin-valve film, and an induction type magnetic element, is used to reproduce the information recorded in the recording layer.

In the reproducing method of the present invention, the recorded information is reproduced by using, for example, the magnetic resistance element, the magnetic element including the spin-valve film, or the induction type magnetic element (induction type magnetic head), while applying the heat to the predetermined area of the magnetic recording medium. The magnetic recording medium may be also heated during the reproduction of information. The magnetic recording medium can be heated, for example, by radiating a laser beam or by applying the radiant heat obtained by using a heater or the like. When the information is recorded, the recording can be performed by applying a magnetic field in which at least one of intensity and polarity is modulated depending on the recording information, while applying heat to the predetermined area of the magnetic recording medium. Further, a series of divided pieces of information, which are recorded at a plurality of positions on the magnetic recording medium respectively, can be simultaneously reproduced by using, for example, a plurality of magnetic heads which carry any one of the magnetic elements described above.

According to a fourth aspect of the present invention, there is provided a recording method for recording information on an information-recording medium including, on a substrate, a recording layer having perpendicular magnetization, the method comprising the step of:

recording the information by irradiating the information-recording medium with a light spot while applying a magnetic field to only an area which is located at the inside of the light spot and which is smaller than the light spot.

In the recording method of the present invention, a recording mark, which is smaller than the light spot, is formed in the area at the inside of the light spot by applying the magnetic field by using, for example, a single magnetic pole head capable of performing perpendicular magnetization recording, while irradiating the information-recording medium with the light spot. Accordingly, it is possible to achieve the super high density recording. In order to form the recording mark which is smaller than the light spot, it is preferable that the single magnetic pole head is machined by means of, for example, FIB (focused ion beam) so that the tip of the single magnetic pole head for generating the line of magnetic force is smaller than the light spot diameter.

According to a fifth aspect of the present invention, there is provided a recording and/or reproducing head for a magnetic recording medium, comprising:

a magnetic field-generating source for applying a recording magnetic field to the magnetic recording medium;

a magnetic element for reading magnetization information on the magnetic recording medium, the magnetic element being selected from the group consisting of a magnetic resistance element, a magnetic element including a spin-valve film, and an induction type magnetic element; and an air slider which carries the magnetic field-generating source and the magnetic element.

The head of the present invention may further comprise a heat source for heating the magnetic recording medium. For example, a laser light source can be used as the heat source. A predetermined area of the medium can be heated by collecting and radiating the laser beam radiated from the laser light source by using an objective lens or the like. In order to introduce the laser beam into the objective lens, for example, it is possible to use an optical fiber. It is desirable that the heat source is provided so that it is arranged at a frontward position (leading side) with respect to the magnetic element in a direction of movement of the magnetic recording medium. In this document, the frontward position (leading side) of an object in a direction of movement of the magnetic recording medium means one side of first and second sides between which the object is positioned and on which the magnetic recording medium approaches first, when the magnetic recording medium is moving toward the object. The backward position (trailing side) of an object in a direction of movement of the magnetic recording medium means one side of first and second sides between which the object is positioned and on which the magnetic recording medium approaches second or later, when the magnetic recording medium is moving toward the object.

The magnetic field-generating source for applying the recording magnetic field to the magnetic recording medium, which is included in the head of the present invention, is constructed, for example, by using a single magnetic pole head 220 as shown in FIG. 20. The single magnetic pole head 220 principally comprises a core (main magnetic pole) 225, a main body 221, and a coil 224 wound around a connecting section 223 therebetween. A protective film may be formed on the inner wall of the core 225. The core 225 is preferably machined by means of, for example, FIB (focused ion beam) so that the width of the tip of the core is not more than 1 µm in the widthwise direction of the track of the magnetic recording medium when the core 225 is opposed to the magnetic recording medium having a plurality of tracks. Accordingly, the information can be recorded at a super high density on the magnetic recording medium. Further, a part of the single magnetic pole head for generating the magnetic field or the entire single magnetic pole head may be constructed by using, for example, a material such as CoNiFe or CoNiFe alloy in which the saturation magnetic flux density (Bs) is not less than 2.0 T. By doing so, it is possible to increase the magnetic force generated by the single magnetic pole head, and it is possible to record the information on the recording medium having a high coercive force.

In the head of the present invention, the magnetic resistance element is an element (MR device: Magneto-Resistive Device) in which the electric resistance varies depending on the change of the magnetic field. Accordingly, the magnetic resistance element makes it possible to detect the magnetization state of the recording layer in the perpendicular direction and the magnetization state of the other magnetic layers in the perpendicular direction and in the in-plane direction. The material for the MR device may be, for example, FeMn/CoNi/Cu/Co. Further, it is possible to use the magnetic element including the spin-valve film and the magnetic element such as the induction type magnetic head. The spin-valve film may be formed, for example, by using CoFe/Cu/CoFe/Ru/CoFe/MnPt. Alternatively, a GMR (Giant Magneto-Resistive) device, which has a large ratio of the change of electric resistance with respect to the change of magnetic field as compared with the MR device, may be also used in place of the magnetic resistance element.

In the present invention, it is desirable that the air slider is constructed by using a plurality of materials having different coefficients of thermal conductivity. Especially, it is desirable that a material having the lowest coefficient of thermal conductivity, of the plurality of materials having the different coefficients of thermal conductivity is provided between the magnetic field-generating source and the magnetic resistance element. Accordingly, the magnetic resistance element is prevented from being heated by the heat generated by the magnetic field-generating source. Further, a material having the highest coefficient of thermal conductivity, of the plurality of materials having the different coefficients of thermal conductivity is formed at a portion, for example, on the upper surface of the head which contacts with the ambient air. By doing so, the heat, which is generated by the magnetic field-generating source, can be released to the outside of the head.

BRIEF DESCRIPTION OF THE DRAWINGS

FIGS. 5A and 5B illustrate the principle of recording to be performed on the magnetic recording medium shown in FIG. 1.

FIGS. 11A and 11B illustrate the principle of recording to be performed on the magnetic recording medium shown in FIG. 9.

FIGS. 14A and 14B illustrate the principle of recording to be performed on the magnetic recording medium shown in FIG. 12.

FIGS. 17A and 17B illustrate the principle of recording to be performed on the magnetic recording medium shown in FIG. 16.

FIG. 28 shows the situation in which the reproduced signal is changed by changing the relative position ($\Delta x$) of the center of the core of the induction type magnetic head with respect to the center of the light spot.

DESCRIPTION OF THE PREFERRED EMBODIMENTS

The magnetic recording medium, the recording and reproducing head therefor, and the magnetic recording and reproducing method therefor according to the present invention will be specifically explained below with reference to the drawings.

First Embodiment

Figure 1:
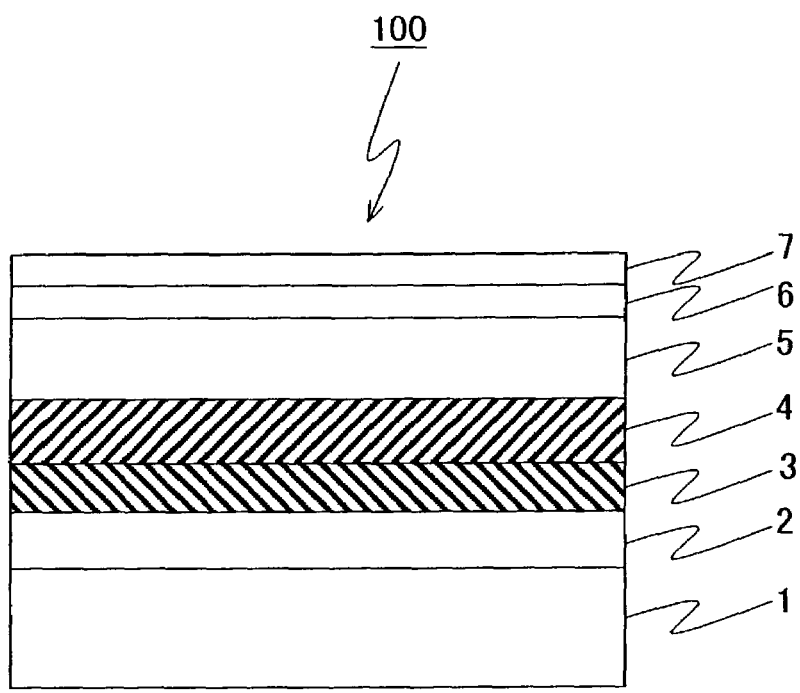
FIG. 1 shows a schematic sectional view illustrating an embodiment of the magnetic recording medium according to the present invention.

FIG. 1 shows a schematic sectional view illustrating an embodiment of the magnetic recording medium according to the present invention. The magnetic recording medium 100 comprises a recording auxiliary layer 2, a recording holding layer 3, a recording control layer 4, a recording layer 5, a protective layer 6, and a lubricant layer 7 which are successively stacked on a substrate 1.

With reference to FIG. 1, the substrate 1 is constructed by using glass, and it has a diameter of 90 mm and a thickness of 1.2 mm. A texture for stabilizing the floating amount of the head may be provided on the substrate 1. The recording auxiliary layer 2 on the substrate 1 is a soft magnetization film, which is constructed by using NiFe (permalloy) having a high magnetic permeability. The Curie temperature Tc6 of NiFe was 500° C. The coercive force Hc6 was not more than 0.1 Oe within a temperature range from the room temperature to the Curie temperature Tc6.

An antiferromagnetic material FeMn, which exhibits the perpendicular magnetic anisotropy, was used for the recording holding layer 3. The composition of the recording holding layer 3 was adjusted so that the Curie temperature Tc3 was 450° C. The recording control layer 4 is composed of an amorphous ferri-magnetic material DyFeCo which exhibits the perpendicular magnetic anisotropy. The composition of the recording control layer 4 was adjusted so that the Curie temperature Tc2 was 200° C. The material DyFeCo, which constitutes the recording control layer 4, exhibits the rare earth-rich (RE-rich) polarity from the room temperature to the Curie temperature Tc2.

Figure 3:
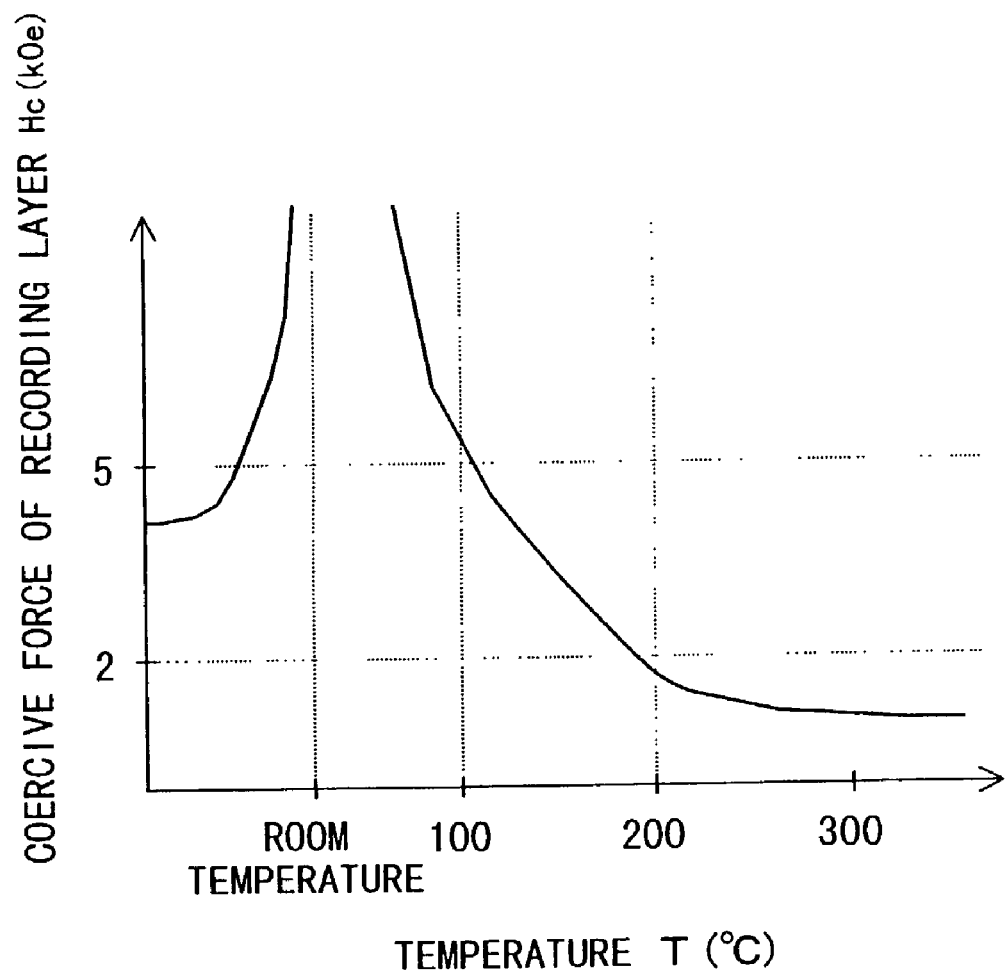
FIG. 3 shows a temperature characteristic of the coercive force of a recording layer of the magnetic recording medium according to the present invention.

The recording layer 5 is constructed by using an amorphous ferri-magnetic material TbFeCo which exhibits the perpendicular magnetic anisotropy. As shown in a graph of the magnetic characteristic in FIG. 3, the composition of the recording layer 5 was adjusted as follows. That is, the coercive force Hc was not less than 5 kOe within a temperature range from the room temperature to 100° C., and it was not more than 2 kOe within a temperature range from 200° C. to 300° C. Further, the Curie temperature Tc was 300° C., and the compensation temperature was in the vicinity of the room temperature. The protective layer 6 is composed of a non-magnetic material SiN.

The layers 2 to 6 were successively formed as films by means of sputtering respectively by using a sputtering apparatus. Each of the layers had the following thickness of the film. The recording auxiliary layer 2 had a thickness of 500 nm, the recording holding layer 3 had a thickness of 30 nm, the recording control layer 4 had a thickness of 10 nm, the recording layer 5 had a thickness of 100 nm, and the protective layer 6 had a thickness of 10 nm.

Subsequently, the lubricant layer 7 was applied to the surface of the protective film 6 by means of spin coating so that the film thickness was 2 nm. A heptane solution, which contained major components of modified silicone and dimethyl silicone added with fatty acid, was used for the lubricant layer 7. Thus, the magnetic recording medium 100 having the structure shown in FIG. 1 was produced.

Figure 2:
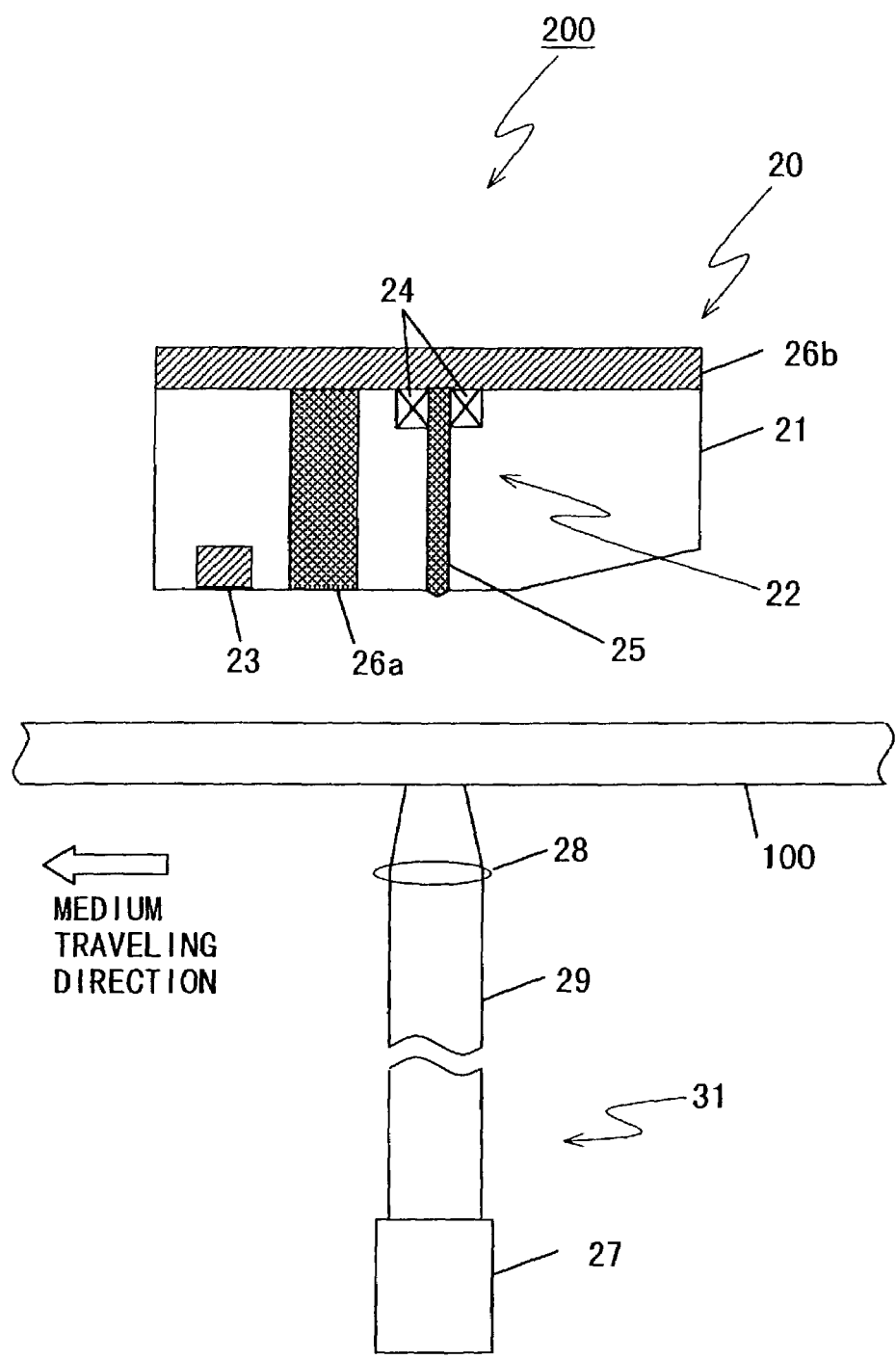
FIG. 2 shows a schematic sectional view illustrating an embodiment of the recording and reproducing head according to the present invention.

FIG. 2 shows a specified embodiment of the recording and reproducing head according to the present invention. The recording and reproducing head 200 comprises a main head body 20 and a heat source 31 for heating the magnetic recording medium. The main head body 20 includes an air slider 21, and it further includes a recording magnetic head 22 and a reproducing MR head 23 which are carried on the air slider 21. The air slider 21 is composed of a ceramic material. The use of the air slider 21 makes it possible to allow the main head body 20 to float over the medium surface while giving a predetermined spacing distance therefrom. In this embodiment, the recording and reproducing head 200 was designed so that the main head body 20 floated at a height of 50 nm over the surface of the magnetic recording medium 100 during the recording and reproduction.

The recording magnetic head 22 is a single magnetic pole head which is capable of applying the magnetic field in the direction perpendicular to the surface of the magnetic recording medium 100. The recording magnetic head 22 comprises a magnetic coil 24 and an iron core 25. The iron core 25 is composed of NiFe having a large high frequency magnetic permeability, and it has a cylindrical configuration extending in the perpendicular direction (vertical direction in FIG. 2) of the main head body 20. The tip of the iron core 25, which is disposed on the side opposing to the magnetic recording medium 100, is machined by means of FIB (focused ion beam) so that the width is not more than 1 μm in the direction (widthwise direction of the track) perpendicular to the direction of the track. The magnetic coil 24 is composed of copper wire, and it is provided to surround the outer circumference of the iron core 25. A minute recording mark can be formed on the magnetic recording medium 100 by generating the magnetic field modulated corresponding to the recording data by using the recording magnetic head 22 having the structure as described above. The recording magnetic head 22 is capable of generating a magnetic field of 500 Oe at the maximum. A magnetic field of not less than 1000 Oe can be also generated by forming the tip of the single magnetic pole head by using, for example, a material composed of CoNiFe or an alloy containing the same in which saturation magnetic flux density (Bs) is not less than 2.0 T.

The reproducing MR head 23 is an MR head for reproducing perpendicular magnetization, which is capable of detecting the magnetization state in the perpendicular direction. The MR device is composed of FeMn/CoNi/Cu/Co. The reproducing MR head 23 is provided at a backward position (in the leftward direction in FIG. 2) with respect to the recording magnetic head 22 in the traveling direction of the magnetic recording medium 100 as indicated by the arrow in FIG. 2. The reproducing MR head 23 is capable of reading the data subjected to the perpendicular magnetic recording in the recording layer of the magnetic recording medium. The sensitivity to the magnetic field can be further improved by using a magnetic element having a spin-valve film such as CoFe/Cu/CoFe/Ru/CoFe/MnPt, in place of the MR device.

The main head body 20 includes heat release members 26a, 26b which are provided between the reproducing MR head 23 and the recording magnetic head 22 and on the upper surface of the main head body 20 respectively. Both of the heat release members 26a, 26b are composed of Al having a high coefficient of thermal conductivity. The heat release members 26a, 26b release, to the outside of the main head body, the heat generated by the magnetic coil 24. Thus, it is possible to prevent the reproducing MR head 23 from being heated.

The heat source 31 principally comprises a laser light source 27, an objective lens 28, and an optical fiber 29. The heat source 31 is provided at a position opposing to the main head body 20 with the magnetic recording medium interposed therebetween. The laser light source 27 is a semiconductor laser having an oscillation wavelength of 640 nm. The objective lens 28 has NA (Numerical Aperture) of 0.6. The laser beam, which is radiated from the laser light source 27, is introduced into the objective lens 28 by the aid of the optical fiber 29. The laser beam comes into the magnetic recording medium from the side of the substrate, and it is collected on a predetermined area of the recording layer.

Experiment of Recording and Reproduction

Figure 4A:
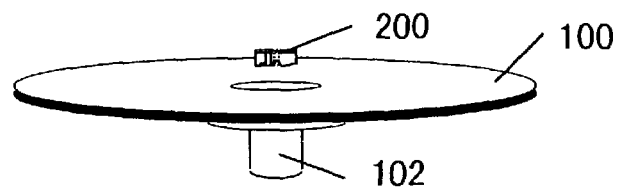
FIG. 4A schematically shows an outline of an experiment of recording and reproduction on the magnetic recording medium.
Figure 4B:
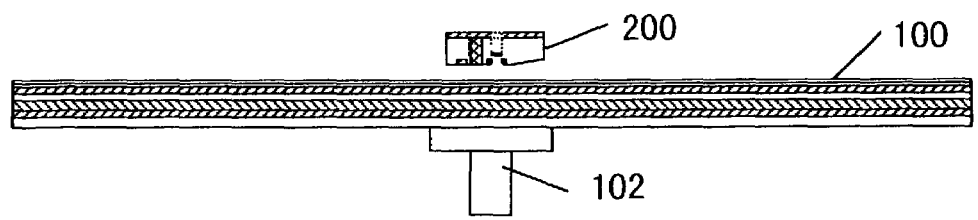
FIG. 4B shows a sectional view illustrating an arrangement of the magnetic recording medium and the recording and reproducing head.

An experiment of recording and reproduction was carried out by using the magnetic recording medium 100 and the recording and reproducing head 200. FIG. 4A conceptually shows the arrangement of the magnetic recording medium and the recording and reproducing head used in the experiment of recording and reproduction. FIG. 4B shows a sectional view illustrating these components. In the experiment of recording and reproduction as shown in FIG. 4A, the magnetic recording medium 100 is installed such that a spindle 102 is inserted into an unillustrated central opening. The recording and reproducing head 200 is arranged on the side of the lubricant layer (on the side opposite to the substrate) of the magnetic recording medium 100. Although not shown in the drawings, the objective lens, which is used to collect the laser beam on the magnetic recording medium 100, is arranged at a position opposing to the recording and reproducing head 200 with the magnetic recording medium 100 interposed therebetween. The laser beam is collected, and it comes into the magnetic recording medium from the side of the substrate.

Explanation will now be made for the principle of recording to be performed to record the data on the magnetic recording medium 100. At first, the laser beam is collected and radiated onto the predetermined area of the magnetic recording medium 100, while rotating the magnetic recording medium 100 at a predetermined linear velocity. FIG. 5A shows the situation in which the laser beam is collected and radiated onto the magnetic recording medium 100 from the side of the substrate (lower side in FIG. 5A). It is assumed that the magnetic recording medium 100 is moved in the leftward direction in FIG. 5A. The power of the laser beam is adjusted as shown in a graph of the temperature distribution in FIG. 5A such that the maximum temperature Tmax (maximum value of the temperature exhibiting the Gaussian distribution) of the area irradiated with the light spot 41 is not more than the Curie temperature Tc3 (450° C.) of the recording holding layer 3, and the temperature of the area 42 (hereinafter referred to as "magnetic field-applied area"), to which the magnetic field is applied, among area irradiated with the light spot 41 is not less than the Curie temperature Tc (300° C.) of the recording layer 5. An external magnetic field Hex, which is directed vertically upwardly, is applied to the surface of the magnetic recording medium by using the recording magnetic head 22 (single magnetic pole head) simultaneously with the radiation of the laser beam. At this time, the area 42 of the recording layer, to which the external magnetic field is applied, is smaller than the light spot 41.

With reference to FIG. 5A, when the magnetic recording medium 100 is moved leftwardly with respect to the light spot, then the magnetic field-applied area 42 outgoes from the light spot, and it is cooled. FIG. 5B shows the situation in which magnetization of each of the magnetic layers changes during the cooling process of the magnetic field-applied area 42. In the cooling process, when the temperature T of the magnetic field-applied area 42 satisfies (1) Tc2 (Curie temperature of the recording control layer: 200° C.)<T<Tc (300° C.), the magnetization of the magnetic field-applied area of the recording layer appears in the direction of the external magnetic field Hex (in the upward direction in the drawing) in the TM-rich (transition metal-rich) state. When the temperature T satisfies (2) room temperature<T<Tc2 (200° C.), the magnetization of the recording control layer appears in the same direction as that of the magnetization of the recording layer owing to the exchange coupling. Simultaneously, the magnetization state of the recording layer is tightly fixed in the perpendicular direction by the aid of the exchange coupling with the magnetization of the recording holding layer. Owing to the recording auxiliary layer which exhibits the soft magnetization, the magnetic flux (external magnetic field), which is generated from the tip of the core of the recording magnetic head 22 (single magnetic pole head), passes through the recording layer while being converged. Thus, the information is recorded in the recording layer at a super high density.

The principle of recording on the magnetic recording medium 100 having the stacked structure shown in FIG. 1 has been described above. The data was recorded on the magnetic recording medium 100 under the following condition. The magnetic recording medium 100 was rotated at a linear velocity of 1.0 m/s, while the external magnetic field was modulated and applied at 6.25 MHz at a magnetic field intensity of 300 Oe to the magnetic recording medium 100 by using the recording and reproducing head 200. Simultaneously, the laser beam having a laser power of 8 mW was radiated from the side of the substrate. On this condition, the recording was performed at a track pitch (TP) of 0.4 µm and a bit pitch (BP) of 0.08 µm. This condition corresponds to a surface recording density of 20.1 Gbits/in$^2$ and a data transfer rate of 12.5 Mbits/s.

Figure 6:
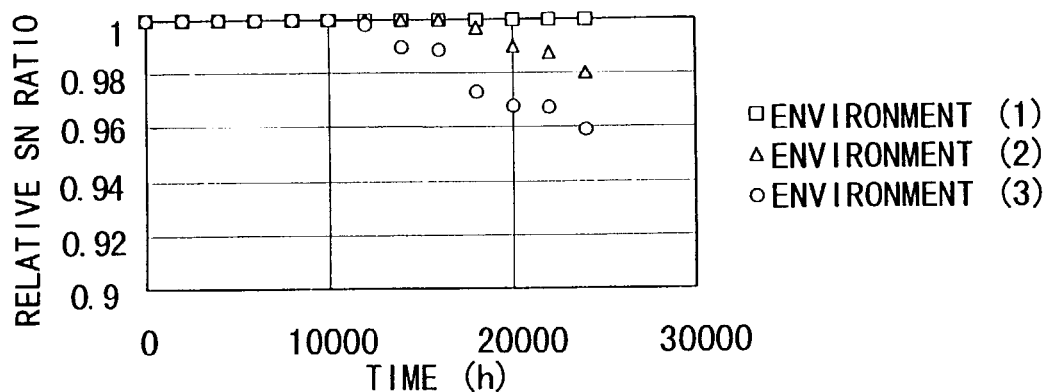
FIG. 6 shows a graph illustrating the environment durability concerning the S/N ratio of the magnetic recording medium according to the present invention.

The magnetization state (recording data) of the recording layer was detected by using the recording and reproducing head 200 for the magnetic recording medium 100 having been subjected to the recording as described above to measure the S/N ratio. Subsequently, in order to investigate the environment durability of the magnetic recording medium, the magnetic recording medium was left to stand for a predetermined period of time under the following three environmental conditions while retaining the recording data. After that, the S/N ratio was measured again. The environment (1) was at 60° C. and 90% RH, the environment (2) was at 70° C. and 90% RH, and the environment (3) was at 80° C. and 90% RH. FIG. 6 shows a graph illustrating the situation of the change of the S/N ratio of the magnetic recording medium in each of the environments. In the graph shown in FIG. 6, the vertical axis indicates the S/N ratio (relative S/N ratio) as a relative value obtained by normalizing the S/N ratio measured after being left to stand in the environment described above, with the S/N ratio measured before being left to stand. According to the graph shown in FIG. 6, it is understood that even in the severest environment (3), the relative S/N ratio of not less than 95% is retained after the passage of 10,000 hours.

Figure 7:
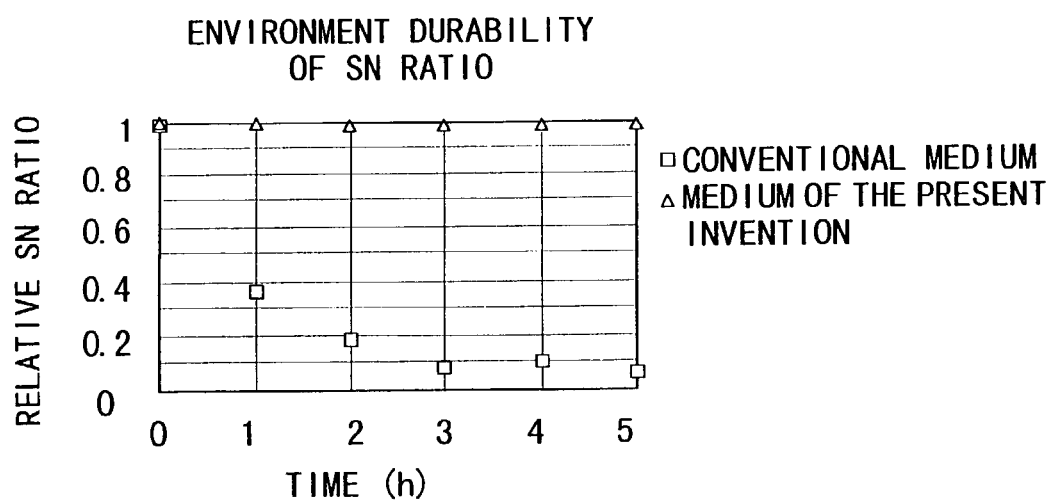
FIG. 7 shows a graph illustrating the comparison of the environment durability concerning the S/N ratio between the magnetic recording medium according to the present invention and a conventional magnetic recording medium.

Next, the durability of the S/N ratio was investigated under the environment at 80° C. and 90% RH for the magnetic recording medium of the present invention and for a conventional magnetic recording medium based on the use of a recording layer comprising a magnetic material composed of CoCr exhibiting perpendicular magnetization. At first, the magnetic recording (longitudinal magnetic recording) was performed on the conventional magnetic recording medium by using a conventional ring head with TP=1.6 µm and BP=0.2 µm (2 Gbits/in$^2$). The recorded information was reproduced by using an MR head to measure the S/N ratio. Subsequently, the magnetic recording medium was left to stand for a predetermined period of time in the environment described above (80° C., 90% RH). After that, the S/N ratio was measured again by using the MR head. On the other hand, the recording was performed on the magnetic recording medium 100 of the present invention by using the recording and reproducing head 200 of the present invention with TP=1.6 µm and BP=0.2 µm (2 Gbits/in$^2$). The recorded information was reproduced by using the recording and reproducing head 200 of the present invention to measure the S/N ratio. Subsequently, the magnetic recording medium was left to stand for a predetermined period of time in the environment described above (80° C., 90% RH). After that, the S/N ratio was measured again by using the recording and reproducing head 200 of the present invention. FIG. 7 shows a graph illustrating the situation of the change of the S/N ratio concerning the conventional magnetic recording medium and the magnetic recording medium of the present invention. In the graph shown in FIG. 7, the vertical axis indicates the S/N ratio (relative S/N ratio) as a relative value obtained by normalizing the S/N ratio measured after being left to stand in the environment described above, with the S/N ratio measured before being left to stand. As understood from the graph shown in FIG. 7, in the case of the conventional magnetic recording medium, the relative S/N ratio was remarkably lowered in the environment at 80° C. and 90% RH. The relative S/N ratio was lowered to be not more than 0.4 after 1 hour. On the contrary, the magnetic recording medium of the present invention maintained the high relative S/N ratio even after the passage of 5 hours. According to this fact, it is understood that the magnetic recording medium of the present invention has the high environment durability as compared with the conventional magnetic recording medium.

Figure 8:
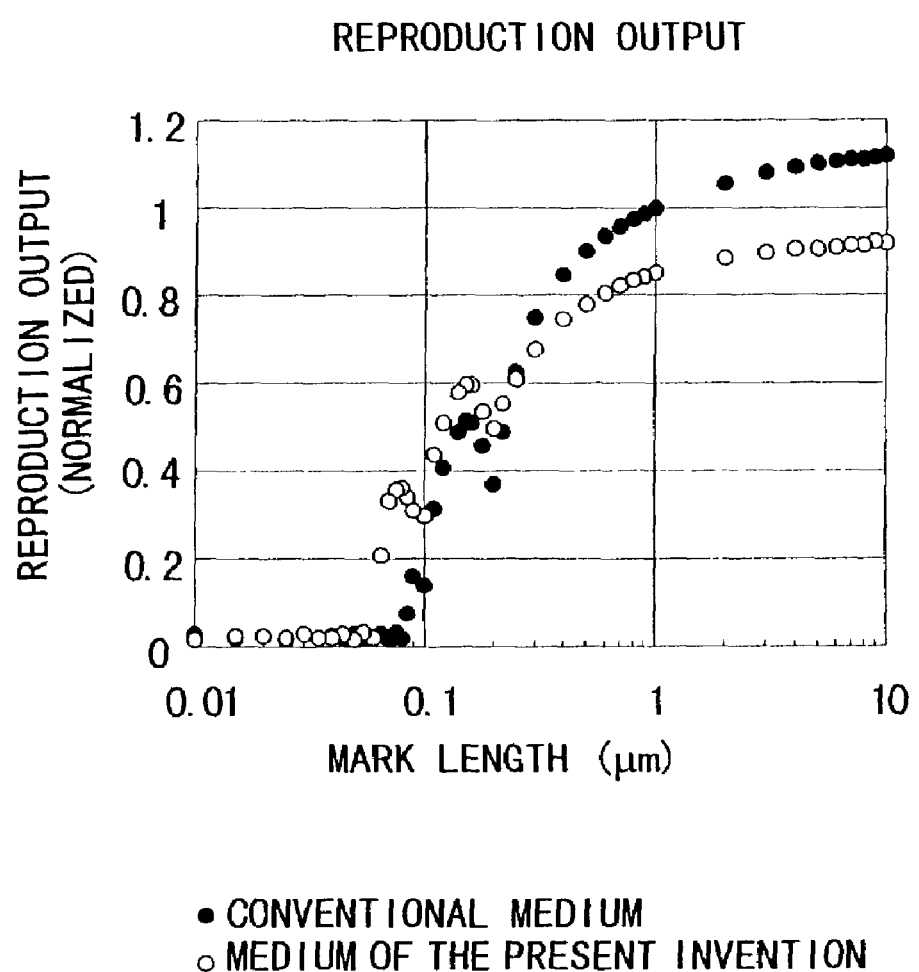
FIG. 8 shows a graph illustrating the situation of the change of reproduction output with respect to the recording mark length of the magnetic recording medium.

Next, the dependency of the reproduction output on the recording mark length was investigated for the magnetic recording medium 100 according to the present invention and for the conventional magnetic recording medium described above. The dependency on the recording mark length was investigated as follows for the magnetic recording medium 100 of the present invention. That is, the recording was performed with various recording mark lengths by using the head according to the present invention described above, and the reproduction was performed by using a Giant Magneto-resistive (GMR) head. On the other hand, as for the conventional magnetic recording medium, the recording (longitudinal magnetic recording) was performed by using the conventional ring head, and the reproduction was performed by using the GMR head. In the case of both of the magnetic recording medium of the present invention and the conventional magnetic recording medium, the track pitch was 1.6 μm, and the GMR head used therefor had a shield distance of 0.2 μm. FIG. 8 shows a graph illustrating the situation of the change of the reproduction output with respect to the recording mark length concerning the magnetic recording medium of the present invention and the conventional magnetic recording medium. In the graph shown in FIG. 8, the vertical axis indicates the reproduction output obtained by effecting the normalization with a reproduced signal amplitude obtained when the recording mark having a recording mark length of 1.0 μm was subjected to the reproduction on the conventional magnetic recording medium. As understood from the graph shown in FIG. 8, the reproduction output, which is obtained by using the magnetic recording medium of the present invention, is higher than the reproduction output obtained by using the conventional magnetic recording medium, when the recording mark length is narrowed to be not more than 0.2 μm.

Second Embodiment

Figure 9:
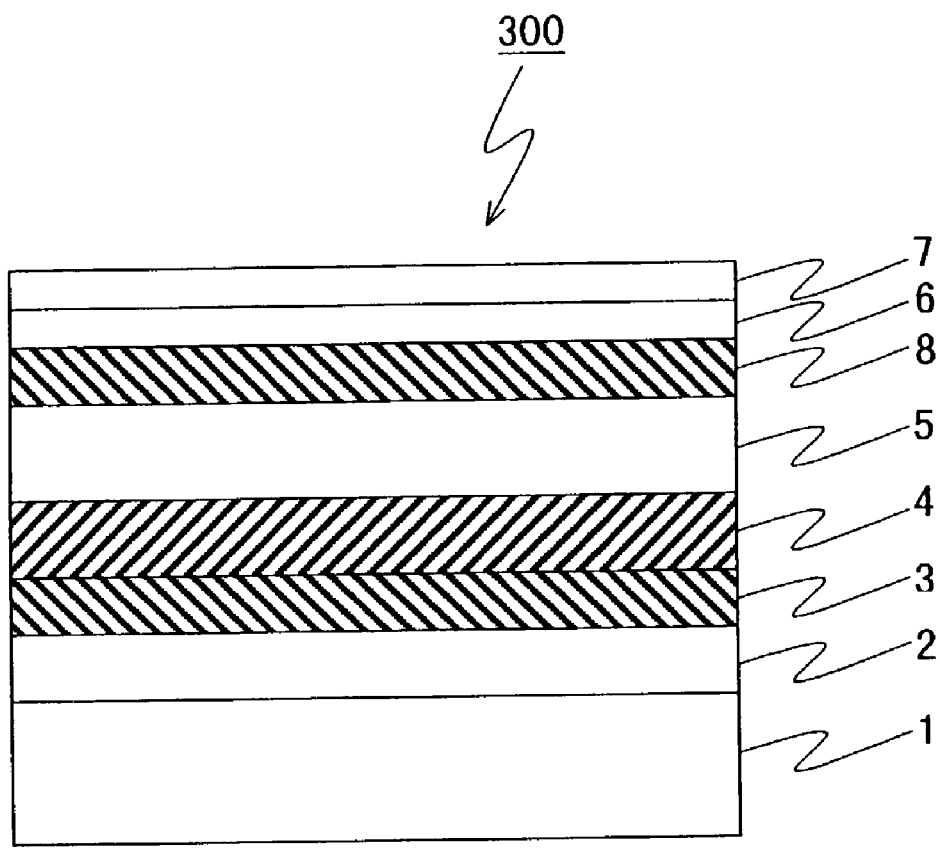
FIG. 9 schematically shows a sectional view illustrating a magnetic recording medium according to the present invention produced in the second embodiment.

FIG. 9 shows a schematic sectional view illustrating another specified embodiment of the magnetic recording medium according to the present invention, which is different from the magnetic recording medium described in the first embodiment. The magnetic recording medium 300 is a magnetic recording medium comprising a reproducing layer 8 which is provided between the recording layer 5 and the protective layer 6 of the magnetic recording medium 100 shown in FIG. 1. The magnetic recording medium 300 includes a recording holding layer 3, a recording control layer 4, a recording layer 5, a reproducing layer 8, a protective layer 6, and a lubricant layer 7 which are successively stacked on a substrate 1. The magnetic recording medium 300 having such a structure was produced in the same manner as in the first embodiment except that the material for constructing the recording control layer 4 is changed to amorphous ferri-magnetic TbFeCo, the film thickness of the recording layer 5 was changed to 50 nm, and the recording layer 8 was formed as a film having a thickness of 20 nm on the recording layer 5.

With reference to FIG. 9, the recording control layer 4 is composed of an amorphous ferri-magnetic film TbFeCo which exhibits the perpendicular magnetic anisotropy. The composition was adjusted so that the Curie temperature Tc2 was 200° C. The recording control layer 4 exhibits the rare earth-rich (RE-rich) polarity from the room temperature to the Curie temperature Tc2.

Figure 10:
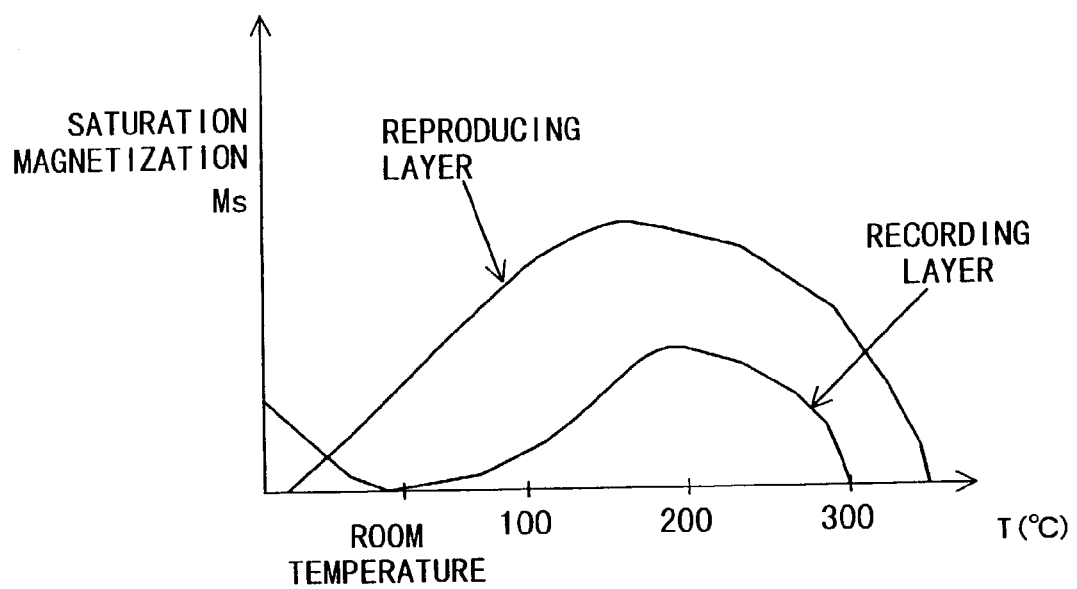
FIG. 10 shows a graph illustrating the temperature characteristic of the saturation magnetization of the reproducing layer and the recording layer of the magnetic recording medium shown in FIG. 9.

The reproducing layer 8 is composed of an amorphous ferri-magnetic film GdFeCo. The Curie temperature Tc4 is 350° C., and the compensation temperature Tcomp4 is not more than the room temperature. The reproducing layer 8 exhibits the transition metal-rich (TM-rich) perpendicular magnetic anisotropy from the room temperature to the Curie temperature. The coercive force Hc4 is not more than 500 Oe. As shown in FIG. 10, the saturation magnetization Ms of the reproducing layer 8 is larger than the saturation magnetization Ms of the recording layer 5 at a temperature of not less than the room temperature.

Experiment of Recording and Reproduction

An experiment of recording and reproduction was carried out in the same manner as in the first embodiment except that the magnetic recording medium 100, which was used in the experiment of recording and reproduction described in the first embodiment, was replaced with the magnetic recording medium 300 produced in the second embodiment.

Explanation will now be made for the principle of recording to be performed on the magnetic recording medium 300. At first, the laser beam is collected and radiated onto a predetermined area of the magnetic recording medium 300 while rotating the magnetic recording medium 300 at a predetermined linear velocity. FIG. 11A shows the situation in which the laser beam is collected and radiated onto the magnetic recording medium 300 from the side of the substrate (lower side in FIG. 11A). It is assumed that the magnetic recording medium 300 is moved in the leftward direction in FIG. 11A. The laser power was adjusted as shown in a graph of the temperature distribution in FIG. 11A such that the maximum temperature Tmax (maximum value of the temperature exhibiting the Gaussian distribution) of the area irradiated with the light spot 41 was not more than the Curie temperature Tc3 (450° C.) of the recording holding layer 3, and the temperature of the magnetic field-applied 42 among area irradiated with the light spot 41 was not less than the Curie temperature Tc4 (350° C.) of the reproducing layer 8. An external magnetic field Hex is applied vertically upwardly to the surface of the magnetic recording medium 300 by using the recording magnetic head 22 (single magnetic pole head) simultaneously with the radiation of the laser beam. At this time, the area 42 of the recording layer, to which the external magnetic field is applied, is smaller than the light spot 41.

With reference to FIG. 11A, the magnetic recording medium 300 is moved leftwardly with respect to the light spot. Accordingly, the magnetic field-applied area 42 outgoes from the light spot, and it is cooled. FIG. 11B shows the situation in which magnetization of each of the magnetic layers changes during the cooling process of the magnetic field-applied area 42. In the cooling process of the magnetic field-applied area 42, when the temperature T of the magnetic field-applied area 42 satisfies (1) Tc (300° C.)<T<Tc4 (350° C.), the magnetization of the magnetic field-applied area of the reproducing layer appears in the direction of the external magnetic field Hex (in the upward direction in FIG. 11) in the TM-rich state. -When the temperature T satisfies (2) Tc2 (200° C.)<T<Tc (300° C.), the magnetization of the recording layer located just under the magnetic field-applied area of the reproducing layer appears in the direction of the external magnetic field Hex (in the upward direction in FIG. 11B) in the TM-rich state. When the temperature T satisfies (3) room temperature<T<Tc2 (200° C.), the magnetization of the recording control layer located just under the recording layer appears in the same direction as that of the magnetization of the recording layer owing to the exchange coupling with the recording layer. Simultaneously, the magnetization state of the recording layer is tightly fixed by the aid of the exchange coupling with the magnetization of the recording holding layer. In accordance with the principle of recording as described above, the information is recorded in the recording layer at a super high density. During the recording process described above, the magnetic flux (external magnetic field), which is generated from the tip of the core of the recording magnetic head 22 (single magnetic pole head), passes through the recording layer while being converged, owing to the recording auxiliary layer which exhibits the soft magnetization.

In order to reproduce the information recorded at the super high density, the magnetization state of the reproducing layer is detected by using the reproducing MR head 23 carried on the recording and reproducing head 200. As described above, the saturation magnetization of the reproducing layer is larger than the saturation magnetization of the recording layer at the room temperature. Accordingly, the leak magnetic field to the reproducing MR head 23 is increased. Therefore, the sensitivity is improved as compared with the case in which the magnetization state of the recording layer is directly reproduced by using the reproducing MR head 23 as performed in the first embodiment. The amplitude of the reproduced waveform is increased as well. Further, as shown in the graph in FIG. 10, the saturation magnetization of the reproducing layer is increased as the temperature is raised from the room temperature. Therefore, the amplitude of the reproduced waveform can be further increased by heating the magnetic recording medium with a low laser power during the reproduction. The principle of reproduction has been described for the magnetic recording medium 300 having the stacked structure shown in FIG. 9.

Next, the data was recorded on the magnetic recording medium 300 under the following condition. The magnetic recording medium 300 was rotated at a linear velocity of 1.0 m/s, and the recording magnetic head 300 was subjected to modulation at 6.25 MHz with an intensity of 300 Oe. Simultaneously, the laser beam of 8 mW was radiated to perform the recording at a track pitch (TP) of 0.4 µm and a bit pitch (BP) of 0.08 µm. This condition corresponds to a surface recording density of 20.1 Gbits/in$^2$ and a data transfer rate of 12.5 Mbits/s.

The information was reproduced to measure the S/N ratio by using the reproducing MR head 22 for the magnetic recording medium 300 having been subjected to the recording with TP=0.4 µm and BP=0.08 µm under the following two conditions respectively, i.e., (a) condition in which the laser beam was not radiated and (b) condition in which the laser beam having a laser power of 1.4 mW was radiated. As a result, the S/N ratio was greater in the case of the condition (b) than in the case of the condition (a).

Third Embodiment

Figure 12:
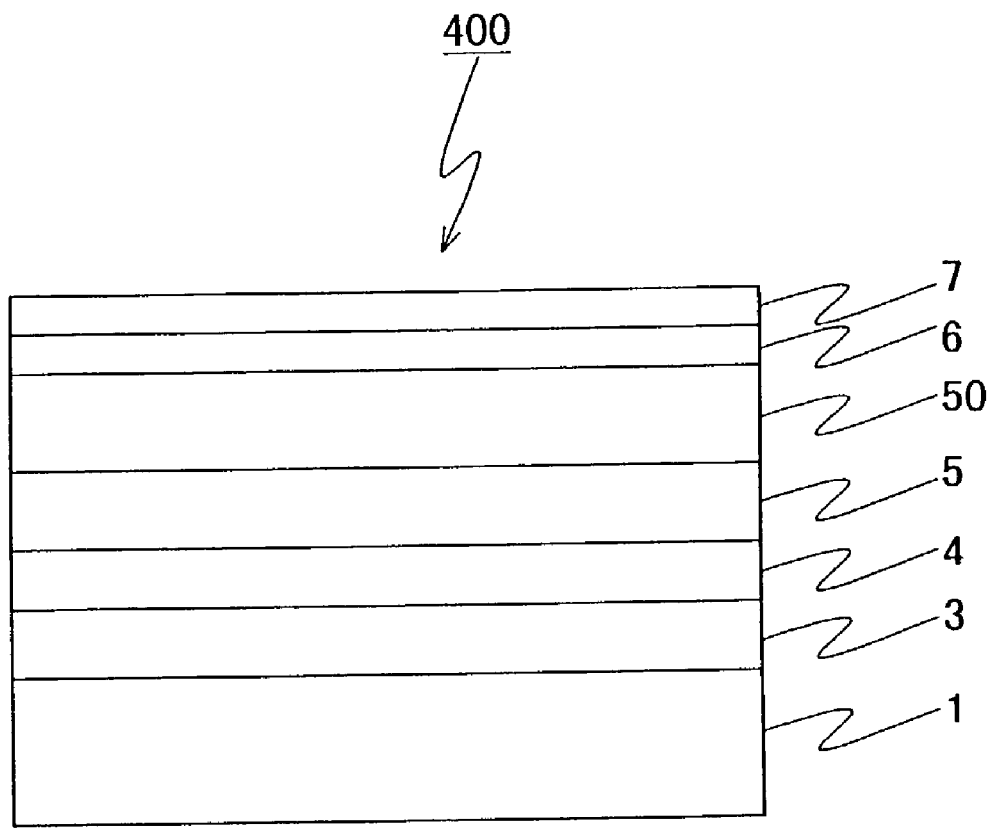
FIG. 12 schematically shows a sectional view illustrating a magnetic recording medium according to the present invention produced in the third embodiment.

FIG. 12 shows a schematic sectional view illustrating another embodiment of the magnetic recording medium according to the present invention. The magnetic recording medium 400 comprises a recording holding layer 3, a recording control layer 4, a recording layer 5, a reproducing layer 50, a protective layer 6, and a lubricant layer 7 which are successively stacked on a substrate 1. The magnetic recording medium 400 having such a structure was produced in the same manner as in the first embodiment except for the following altered points. That is, the recording auxiliary layer 2 described in the first embodiment was not formed on the substrate 1, but the reproducing layer 5 having a characteristic as described later on was formed as a film having a thickness of 20 nm on the recording layer 5. The recording control layer 4 was constructed by using amorphous ferri-magnetic TbFeCo having a magnetic characteristic as described later on. The film thickness of the recording holding layer 3 was changed to 50 nm.

With reference to FIG. 12, the recording control layer 4 was constructed by using an amorphous ferri-magnetic film TbFeCo exhibiting the perpendicular magnetic anisotropy. The composition of the recording control layer 4 was adjusted so that the Curie temperature Tc2 was 200° C. The recording control layer 4 exhibits the rare earth-rich (RE-rich) polarity from the room temperature to the Curie temperature. The reproducing layer 50 was constructed by using an amorphous ferri-magnetic film GdFeCo having a Curie temperature Tc4 of 280° C. The composition of the recording layer 50 was adjusted so that the in-plane magnetization was exhibited from the room temperature to 150° C., and the perpendicular magnetization was exhibited at a temperature of not less than 150° C. The critical temperature, at which the magnetization changes from the in-plane magnetization to the perpendicular magnetization, is called "perpendicular transition temperature", and this critical temperature is represented by Tcr4.

Figure 13:
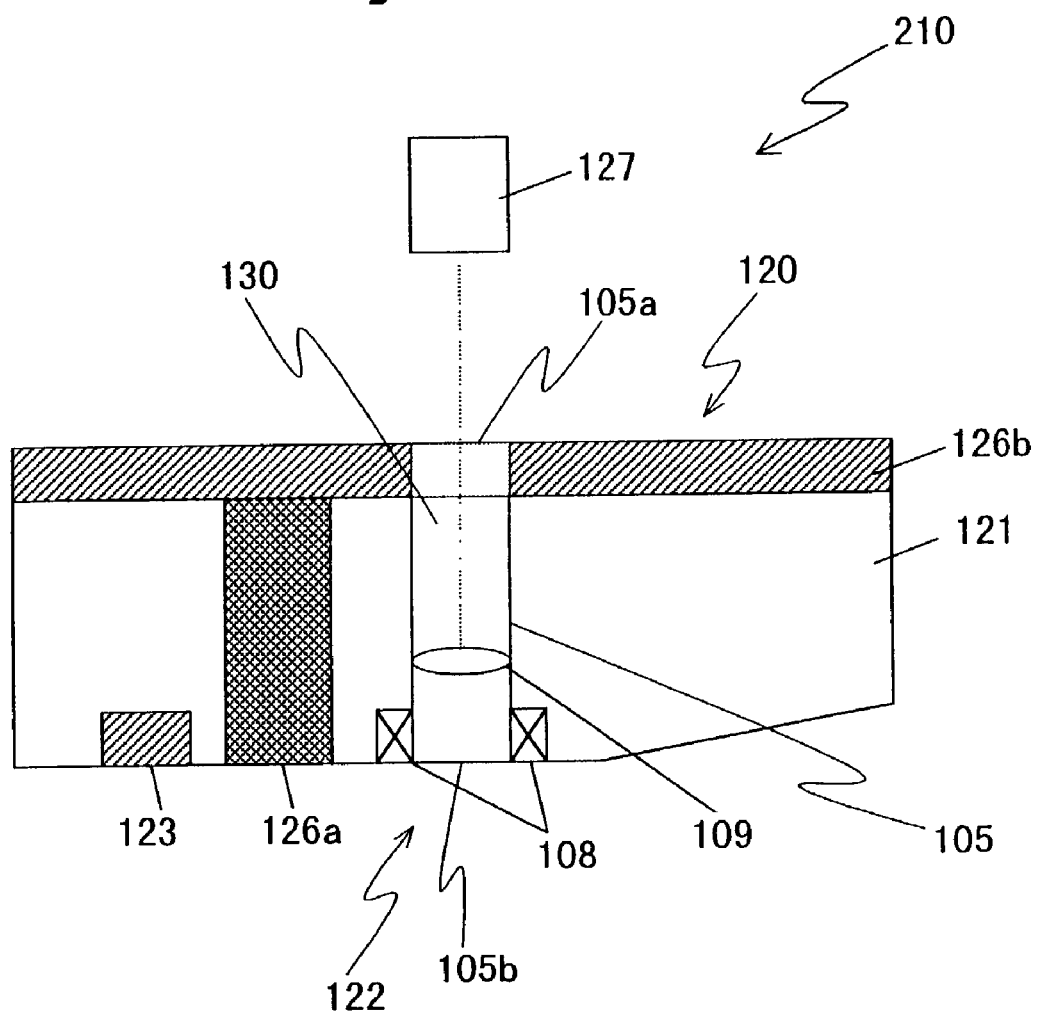
FIG. 13 shows a schematic sectional view illustrating a recording and reproducing head according to the present invention used in the third embodiment.

FIG. 13 shows a schematic arrangement illustrating a specified embodiment of the recording and reproducing head according to the present invention, which is different from the recording and reproducing head used in the first embodiment. The recording and reproducing head 210 comprises a main head body 120 and a laser light source 127 for heating the medium. The laser light source 127 is a semiconductor laser having an oscillation frequency of 460 nm. The main head body 120 includes an air slider 121, and it also includes a recording magnetic head (magnetic coil) 122 and a reproducing MR head 123 which are carried on the air slider 121. The air slider 121 is made of a ceramic material (or transparent glass). The use of the air slider 121 makes it possible to allow the main head body 120 to float over the medium surface while giving a predetermined spacing distance therefrom. In this embodiment, the recording and reproducing head 210 was designed so that the main head body 120 floated over the surface of the medium at a height of 50 nm during the recording and reproduction.

With reference to FIG. 13, the recording magnetic head 122 is a single magnetic pole head capable of applying the magnetic field in the perpendicular direction with respect to the medium surface. The recording magnetic head 122 comprises a magnetic coil 108 and an annular core 105. The core 105 is constructed by using a ferromagnetic material NiFe having a large high frequency magnetic permeability. As shown in FIG. 13, the core 105 is fitted such that its outer circumference is joined to the inner circumference of a through-hole 130 which is formed through the slider from the upper surface to the lower surface thereof. The magnetic coil 108 is composed of copper wire. The magnetic coil 108 is provided at a lower portion of the core 105 to surround the outer circumference of the core 105. The data can be recorded on the medium by generating the external magnetic field modulated depending on the recording data by using the recording magnetic head 122 constructed as described above. The recording magnetic head 122 is capable of generating a magnetic field of 500 Oe at the maximum.

With reference to FIG. 13 again, an objective lens 109, which is used to collect the laser beam on the medium, is inserted into the inside of the annular core 105. The objective lens 109 has NA (Numerical Aperture) of 0.85. The objective lens 109 collects the laser beam coming from an upper opening 105a of the core 105 so that the laser beam is radiated toward the medium from a lower opening 105b of the core 105.

The reproducing MR head 123 is an MR head for reproducing perpendicular magnetization, which is capable of detecting the magnetization state in the perpendicular direction. The MR device is composed of FeMn/CoNi/Cu/Co. The reproducing MR head is provided at a backward position (in the leftward direction in FIG. 13) with respect to the recording magnetic head concerning the direction of the relative movement with respect to the magnetic recording medium. The reproducing MR head makes it possible to read the data subjected to the perpendicular magnetic recording in the recording layer of the magnetic recording medium.

The main head body 120 includes a heat block layer 126a which is formed between the reproducing MR head 123 and the recording magnetic head 122. The heat block layer 126a is constructed by using ceramic having a low coefficient of thermal conductivity to reduce the influence of the heat generated by the magnetic coil 108, on the reproducing MR head 123. A heat release member 126b, which is composed of Al having a high coefficient of thermal conductivity, is formed on the upper surface of the main head body. The heat release member 126b makes it possible to release, to the outside of the head, the heat generated by the magnetic coil 108.

Recording and Reproduction of Information

The recording and reproduction can be performed by using the magnetic recording medium 400 and the recording and reproducing head 210 described above. The recording and reproduction are performed by charging the magnetic recording medium 400 into an evaluating equipment (drive), and arranging the recording and reproducing head 210 on the side of the lubricant layer of the magnetic recording medium 400 (on the side opposite to the substrate).

Figure 15:
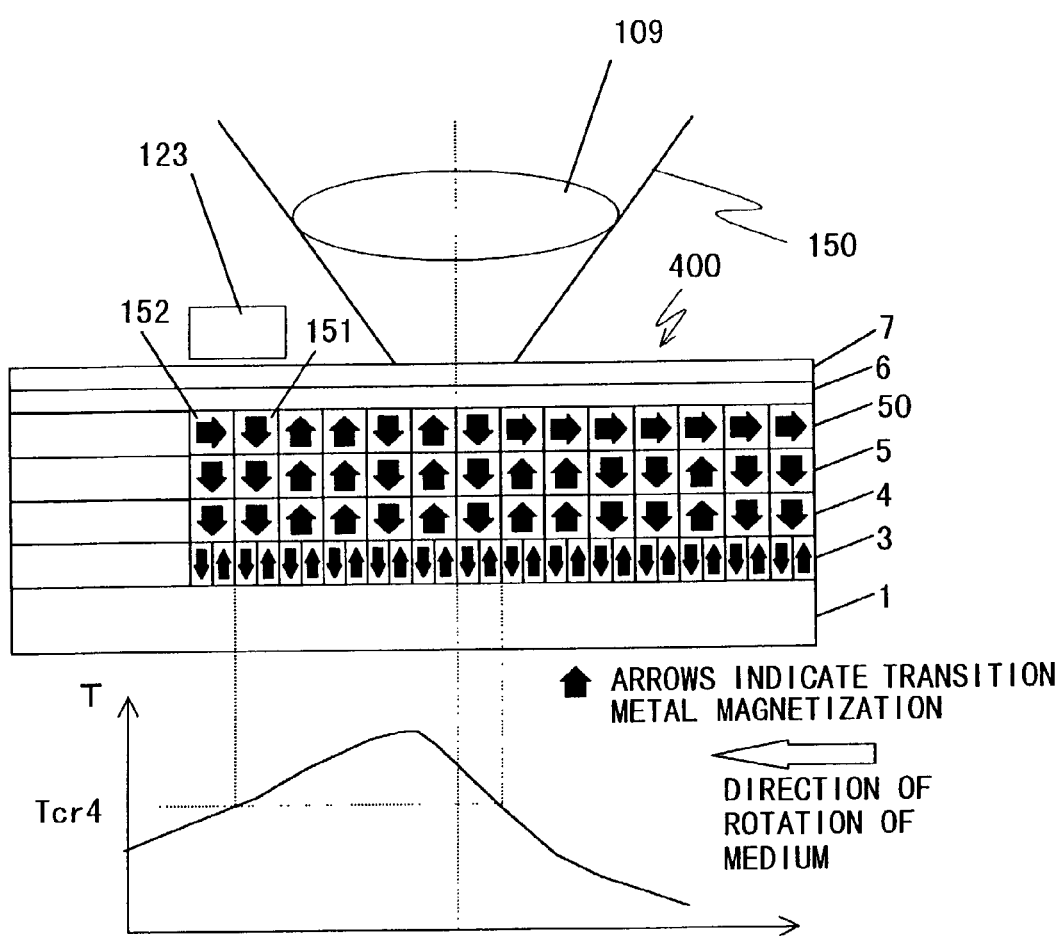
FIG. 15 illustrates the principle of reproduction to be performed on the magnetic recording medium shown in FIG. 12.

Explanation will now be made for the principle of recording and reproduction on the magnetic recording medium 400 with reference to FIGS. 14 and 15. FIG. 14a shows a situation in which the laser beam is collected and radiated onto a predetermined area of the magnetic recording medium 400 from the side of the lubricant layer (upper side in the drawing). It is assumed that the magnetic recording medium 400 is rotated at a predetermined linear velocity, and the magnetic recording medium is moved in the leftward direction in FIG. 14a. The power of the laser beam is previously adjusted as follows as shown in a graph of the temperature distribution in FIG. 14a. That is, the maximum temperature Tmax (maximum value of the temperature exhibiting the Gaussian distribution) of the area irradiated with the light spot 41 is not more than the Curie temperature Tc3 (450° C.) of the recording holding layer 3, and the temperature of a part of the area irradiated with the light spot 41 is not less than the Curie temperature Tc4 (280° C.) of the reproducing layer 8. Simultaneously with the radiation of the laser beam onto the magnetic recording medium 400, an external magnetic field Hex is applied vertically upwardly to the surface of the magnetic recording medium 400 by using the recording magnetic head 122 (single magnetic pole head).

With reference to FIG. 14a, when the magnetic recording medium 400 is moved leftwardly with respect to the light spot, then the area (hereinafter referred to as "high temperature area") heated by the radiation of the light spot outgoes from the light spot, and it is cooled. FIG. 14B shows the situation in which magnetization of each of the magnetic layers changes during the cooling process of the high temperature area. It is assumed that the temperature of the high temperature area is represented by T. As shown in FIG. 14B, when (1) Tc4 (Curie temperature of the reproducing layer: 280° C.)<T <Tc (Curie temperature of the recording layer: 300° C.) is satisfied, the magnetization of the high temperature area of the recording layer appears in the direction of the external magnetic field Hex (in the upward direction) in the TM-rich state. When (2) Tc2 (200° C.)<T<Tc4 (280° C.) is satisfied, the magnetization of the reproducing layer, which is located just over the recording layer, appears in the downward direction (the sub-lattice magnetization of transition metal is in the upward direction) in the RE-rich state owing to the exchange coupling with the magnetization of the recording layer. When (3) Tcr4 (150° C.)<T<Tc2 (200° C.) is satisfied, the magnetization of the recording control layer appears in the same direction as that of the magnetization of the recording area of the recording layer as a result of the exchange coupling with the magnetization of the high temperature area of the recording layer. Simultaneously, the magnetization state of the recording layer is tightly fixed owing to the exchange coupling with the magnetization of the recording holding layer. When (4) room temperature<T<Tcr4 (150° C.) is satisfied, the magnetization of the reproducing layer is directed in the in-plane direction from the perpendicular direction. Accordingly, the information is recorded in the recording layer. Thus, the principle of recording has been described.

Next, the principle of reproduction will be explained. In order to reproduce the information having been recorded on the basis of the principle of recording described above, a reproducing light beam having a low laser power is radiated to heat the magnetic recording medium 400, while rotating the magnetic recording medium 400 at a predetermined linear velocity. FIG. 15 shows a situation in which the reproducing light beam 150 is radiated onto a predetermined area of the magnetic recording medium 400. When the reproducing light beam 150 is radiated onto the magnetic recording medium 400, the surface of the magnetic recording medium 400 is heated to give a temperature distribution as shown in a graph depicted at a lower part of FIG. 15. The magnetization is changed from the in-plane direction to the perpendicular direction in an area of the reproducing layer in which the temperature is not less than the perpendicular transition temperature Tcr4. At this time, the magnetization state of the recording layer located just under the reproducing layer is transferred to the reproducing layer owing to the exchange coupling force. As shown in FIG. 15, the reproducing MR head 123 is disposed just over the boundary at which the magnetization of the reproducing layer changes from the in-plane magnetization to the perpendicular magnetization. The size of the reproducing MR head 123 is larger than the size of the magnetic domain of the reproducing layer. Therefore, a plurality of magnetic domains 151, 152 of the reproducing layer exist in the area disposed just under the reproducing MR head 123. However, the magnetization 152 of the reproducing layer, which is positioned on the left side of the reproducing MR head 123, is directed in the in-plane direction. Therefore, the magnetization 152 of the reproducing layer is not detected by the reproducing MR head 123. The single magnetization 151 in the perpendicular direction, i.e., only the magnetization information in the recording layer disposed just under the magnetization of the reproducing layer is independently extracted. Further, the in-plane magnetization 152 of the reproducing layer serves to avoid any influence of the magnetization state of the recording layer disposed just thereunder. As shown in FIG. 10, the saturation magnetization of the reproducing layer is larger than the saturation magnetization of the recording layer, and it is increased as the temperature is raised. Therefore, the reproducing MR head 123 successfully detects the large leak magnetic field from the reproducing layer by radiating the reproducing light beam to heat the magnetic recording medium as described above. Thus, the principle of reproduction on the magnetic recording medium 400 has been described.

Fourth Embodiment

Figure 16:
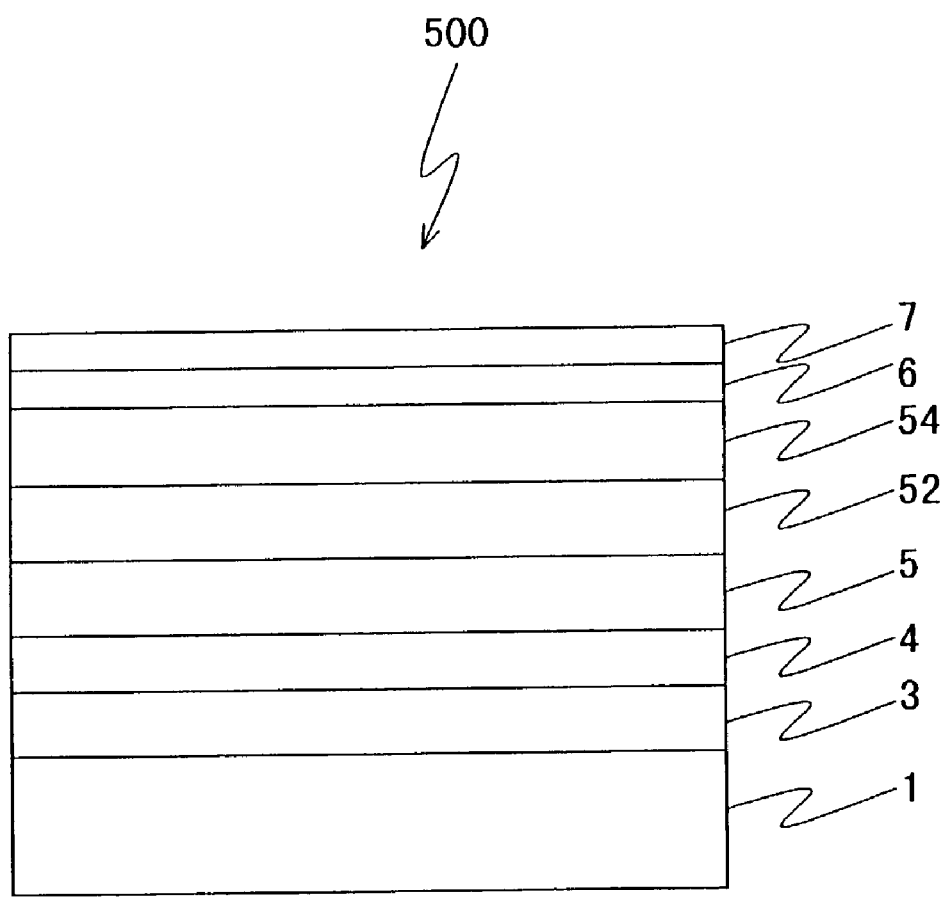
FIG. 16 shows a schematic sectional view illustrating a magnetic recording medium according to the present invention produced in the fourth embodiment.

FIG. 16 shows a schematic sectional view illustrating a specified embodiment of the magnetic recording medium of the present invention, which is different from those explained in the first to third embodiments described above. The magnetic recording medium 500 comprises a recording holding layer 3, a recording control layer 4, a recording layer 5, a mask layer 52, a magnetic transfer layer 54, a protective layer 6, and a lubricating layer 7 which are successively stacked on a substrate 1.

The recording holding layer 3 was constructed by using an antiferromagnetic film NiO exhibiting the perpendicular magnetic anisotropy. The composition of the recording holding layer 3 was adjusted so that the Curie temperature Tc3 was 450° C. The recording control layer 4 was constructed by using a magnetic film DyFeCo exhibiting the perpendicular magnetic anisotropy. The composition of the recording control layer 4 was adjusted so that the Curie temperature Tc2 was 200° C. DyFeCo, for which the composition has been adjusted, exhibits the rare earth-rich (RE-rich) polarity from the room temperature to the Curie temperature.

The mask layer 52 was constructed by using an amorphous ferri-magnetic film GdFeCo. The composition of the mask layer 52 was adjusted so that the Curie temperature Tc4 was 300° C., the in-plane magnetization was exhibited from the room temperature to 150° C., and the perpendicular magnetization was exhibited at a temperature of not less than 150° C. The critical temperature, at which a stable direction of the magnetization changes from the in-plane magnetization to the perpendicular magnetization, is called "perpendicular transition temperature", and this critical temperature is represented by Tcr4. The magnetic transfer layer 54 was constructed by using an amorphous ferri-magnetic film GdFeCo. The composition of the magnetic transfer layer. 54 was adjusted so that the Curie temperature Tc5 was 300° C., the perpendicular magnetization was exhibited from the room temperature to 110° C., the in-plane magnetization was exhibited from 110° C. to 150° C., and the perpendicular magnetization was exhibited from 150° C. to 300° C. The critical temperature (110° C.), at which a stable direction of the magnetization changes from the perpendicular magnetization to the in-plane magnetization, is called "in-plane transition temperature", and this critical temperature is represented by Tcr'5. The magnetic material for the magnetic transfer layer 54 has such a property that the exchange coupling force in the in-plane direction is weakened at a high temperature.

Materials, which were equivalent to the materials for the magnetic recording medium produced in the first embodiment, were used for constructing the recording layer 5, the protective layer 6, and the lubricating layer 7. The recording holding layer 3, the recording control layer 4, the recording layer 5, the mask layer 52, the magnetic transfer layer 54, and the protective layer 6 were successively formed as films by means of sputtering respectively. The respective layers had film thicknesses of 50 nm, 10 nm, 100 nm, 5 nm, 15 nm, and 10 nm in this order. Subsequently, the lubricating layer 7 was formed by means of spin coating to have a film thickness of 2 nm on the protective layer 6. Thus, the magnetic recording medium 500 having the structure shown in FIG. 16 was produced.

Recording and Reproduction of Information

The recording and reproduction can be performed on the magnetic recording medium 500 by using the same recording and reproducing head as that used in the third embodiment except for the use of a reproducing MR head 123' for detecting the in-plane magnetization in place of the reproducing MR head 123 for detecting the perpendicular magnetization. The recording and reproduction are performed by charging the magnetic recording medium 500 into an evaluating equipment (drive), and arranging the recording and reproducing head 210 on the side of the lubricant layer of the magnetic recording medium 500 (on the side opposite to the substrate).

Explanation will now be made for the principle of recording and reproduction on the magnetic recording medium 500 with reference to FIGS. 17 to 19. FIG. 17a shows a situation in which the laser beam is collected and radiated onto a predetermined area of the magnetic recording medium 500 from the side opposite to the substrate 1 (upper side in the drawing). It is assumed that the magnetic recording medium 500 is rotated at a predetermined linear velocity, and the magnetic recording medium is moved in the leftward direction in FIG. 17a. The power of the laser beam is previously adjusted as follows as shown in a graph of temperature distribution in FIG. 17a. That is, the maximum temperature Tmax (maximum value of the temperature exhibiting the Gaussian distribution) of the area irradiated with the light spot 41 is not more than the Curie temperature Tc3 (450° C.) of the recording holding layer 3, and the temperature of a part of the area irradiated with the light spot 41 is not less than the Curie temperature Tc (300° C.) of the recording layer 5. Simultaneously with the radiation of the laser beam onto the magnetic recording medium 500, an external magnetic field Hex is applied vertically upwardly to the surface of the magnetic recording medium 500 by using the recording magnetic head 122 (single magnetic pole head).

With reference to FIG. 17a, when the magnetic recording medium 500 is moved leftwardly with respect to the light spot 41, then the area 45 (high temperature area) heated by the radiation of the light spot 41 outgoes from the light spot 41, and it is cooled. FIG. 17B shows the situation in which magnetization of each of the magnetic layers changes during the cooling process of the high temperature area 45. Concerning FIG. 17B, it is assumed that the temperature of the high temperature 45 area is represented by T. When (1) $Tc4<T<Tc$ is satisfied, the magnetization of the recording layer appears in the direction of the external magnetic field Hex (in the upward direction in the drawing) in the TM-rich state. When (2) $Tc2<T<Tc4$ is satisfied, the magnetization of the mask layer and the magnetic transfer layer appears in the downward direction in the drawing (provided that the magnetization is expressed in FIG. 17B as the sub-lattice magnetization (in the upward direction) of the transition metal) in the RE-rich state owing to the exchange coupling with the magnetization of the recording layer. When (3) $Tcr4<T<Tc2$ is satisfied, the magnetization of the recording control layer appears in the same direction as that of the magnetization of the recording layer as a result of the exchange coupling. Simultaneously, the magnetization state of the recording layer is tightly fixed owing to the exchange coupling with the magnetization of the recording holding layer. When (4) $Tcr'5<T<Tcr4$ is satisfied, the magnetization of the mask layer 52 is directed from the perpendicular direction to the in-plane direction. When (5) room temperature $<T<Tcr'5$ is satisfied, the magnetization of the magnetic transfer layer 54 is directed from the in-plane direction to the perpendicular direction. Accordingly, the information is recorded in the recording layer. Thus, the principle of recording on the magnetic recording medium 500 has been described.

Next, explanation will be made for the principle of reproduction of the information recorded on the basis of the principle of recording described above. At first, explanation will be made for a case in which the recording magnetic domain in the recording layer intended to be reproduced is formed in the downward direction as shown in FIG. 18. The magnetic recording medium 500 is heated by radiating a reproducing light beam having a low laser power while rotating the magnetic recording medium 500 at a predetermined linear velocity. When the reproducing light beam is radiated onto the magnetic recording medium 500, the surface of the magnetic recording medium is heated in a temperature distribution as shown in a lower part of FIG. 18. During this process, only the magnetization 180, which is located in the temperature area at a temperature of not less than the perpendicular transition temperature Tcr4 (150° C.) of the mask layer 52, is changed from the in-plane direction to the perpendicular direction. When the downward magnetization 181 is formed in the recording layer, then the magnetization 180 of the mask layer 52 makes exchange coupling with the downward magnetization 181 of the recording layer disposed just under the mask layer 52, and it is directed in the direction, i.e., in the downward direction which reflects the magnetization state of the recording layer as shown in FIG. 18.

Figure 18:
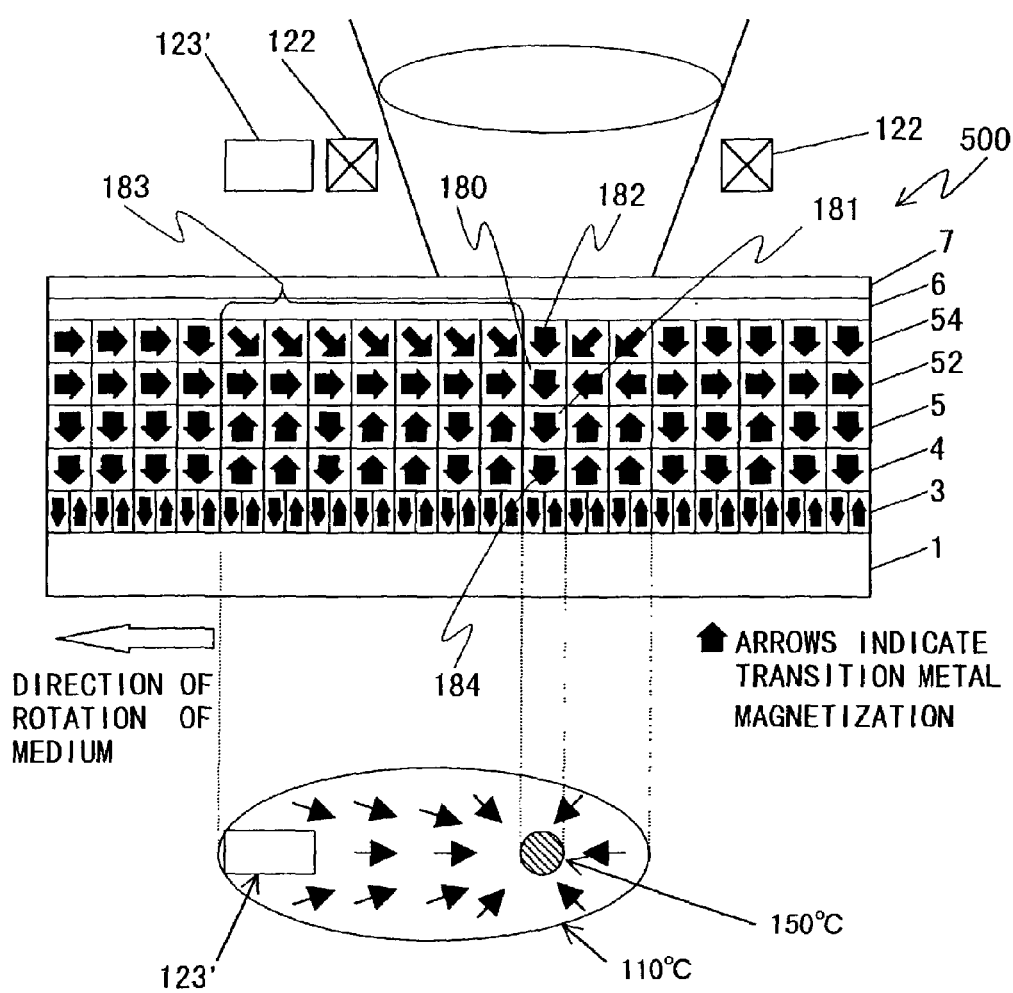
FIG. 18 illustrates the principle of reproduction concerning a case in which a downward recording magnetic domain is formed in the recording layer of the magnetic recording medium shown in FIG. 16.

The magnetization 182, which is located in the temperature area of the magnetic transfer layer 54 at a temperature of not less than 150° C., is changed from the in-plane direction to the perpendicular direction, it makes exchange coupling with the magnetization 180 of the mask layer 52, and it is directed in the direction, i.e., in the downward direction which reflects the magnetization state of the recording layer 5 as shown in FIG. 18. The magnetization 183, which is located in the temperature area at a temperature of not less than the in-plane transition temperature Tcr'5 (110° C.) of the magnetic transfer layer 54 and less than 150° C., is changed from the perpendicular direction to the in-plane direction. During this process, the magnetization 183 of the magnetic transfer layer 54 is changed to rightwardly offset obliquely downward magnetization as shown in FIG. 18, by the aid of the magnetic field exerted by the magnetization 181 of the recording layer 5 and the magnetization 184 of the recording control layer. The in-plane component of the rightwardly offset obliquely downward magnetization of the magnetic transfer layer 54 is detected by using the MR head 123' for detecting the in-plane magnetization. As described above, the downward magnetization of the recording layer is transferred to the magnetic transfer layer, and it is magnified approximately up to the temperature area at the temperature of not less than the in-plane transition temperature Tcr'5 (110° C.) of the magnetic transfer layer so that the information is reproduced.

The principle of reproduction has been described for the case in which the recording magnetic domain intended to be reproduced is in the downward direction. Next, explanation will be made for a case in which the recording magnetic domain is in the upward direction with reference to FIG. 19. When the reproducing light beam is radiated onto the magnetic recording medium 500 in the same manner as described above, the surface of the magnetic recording medium is heated in a temperature distribution as shown in a lower part of FIG. 19. During this process, only the magnetization 190, which is located in the temperature area at a temperature of not less than the perpendicular transition temperature Tcr4 (150° C.) of the mask layer 52, is changed from the in-plane direction to the perpendicular direction. The magnetization 190 of the mask layer 52 makes exchange coupling with the upward magnetization 191 of the recording layer disposed just under the mask layer 52, and it is directed in the direction, i.e., in the upward direction which reflects the magnetization state of the recording layer as shown in FIG. 19.

Figure 19:
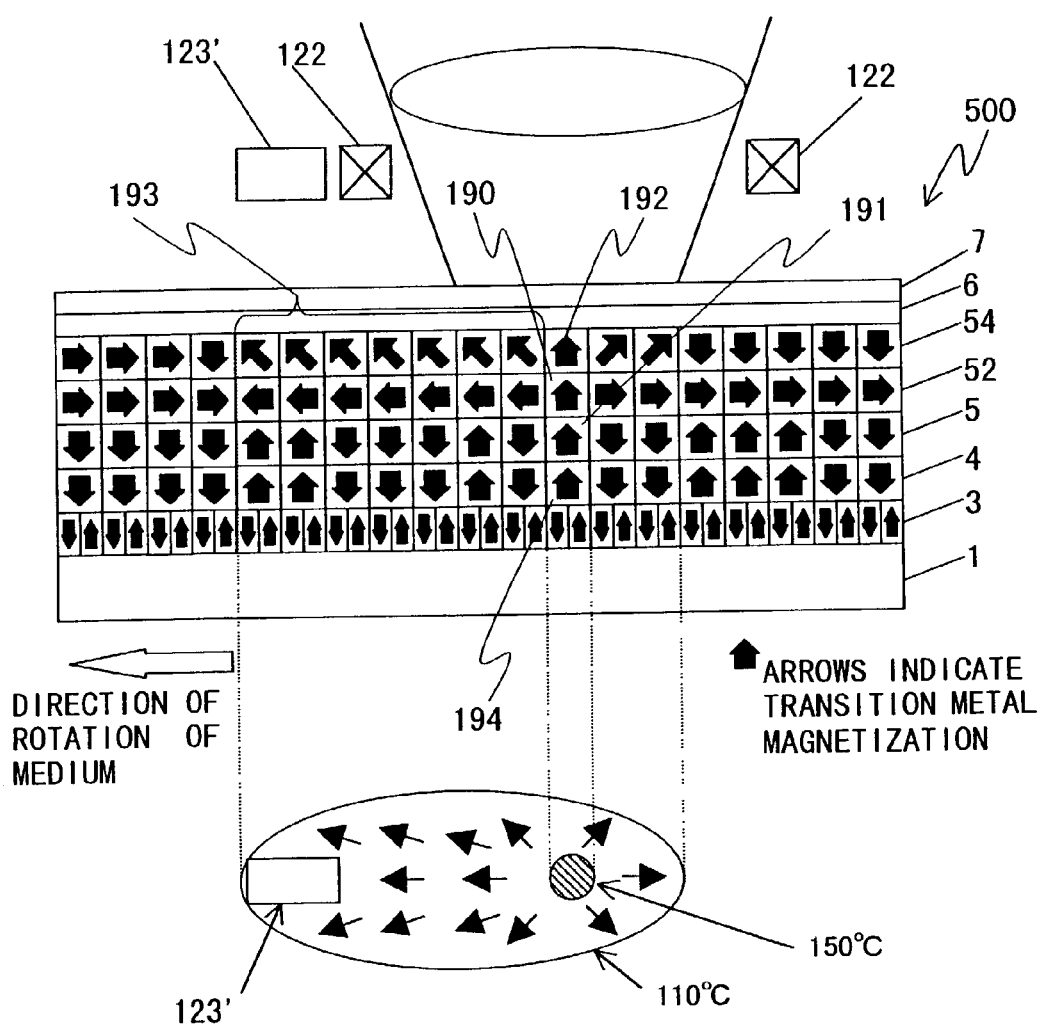
FIG. 19 illustrates the principle of reproduction concerning a case in which an upward recording magnetic domain is formed in the recording layer of the magnetic recording medium shown in FIG. 16.
Figure 20:
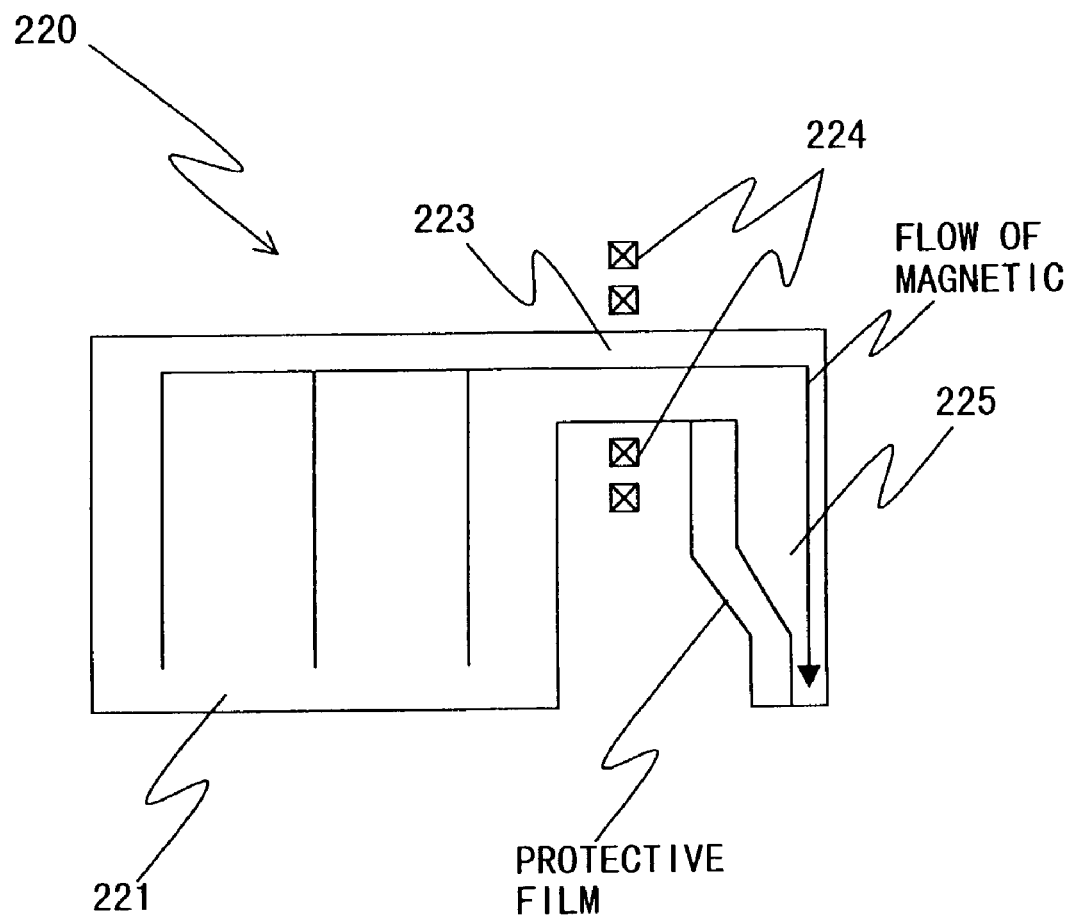
FIG. 20 schematically shows a cross-sectional structure of a single magnetic pole head.

The magnetization 192, which is located in the temperature area of the magnetic transfer layer 54 at a temperature of not less than 150° C., is changed from the in-plane direction to the perpendicular direction, it makes exchange coupling with the magnetization 190 of the mask layer 52, and it is directed in the direction, i.e., in the upward direction which reflects the magnetization state of the recording layer 5 as shown in FIG. 19. The magnetization 193, which is located in the temperature area at a temperature of not less than the in-plane transition temperature Tcr'5 (110° C.) of the magnetic transfer layer 54 and less than 150° C., is changed from the perpendicular direction to the in-plane direction. The magnetization 193 of the magnetic transfer layer 54 is changed to leftwardly offset obliquely upward magnetization as shown in FIG. 19, by the aid of the magnetic field exerted by the magnetization 191 of the recording layer 5 and the magnetization 194 of the recording control layer. The in-plane component of the leftwardly offset obliquely upward magnetization of the magnetic transfer layer 54 is detected by using the MR head 123' for detecting the in-plane magnetization. As described above, the upward magnetization and the downward magnetization, which are formed in the recording layer, are reproduced while being distinguished from each other. Thus, the principle of reproduction on the magnetic recording medium 500 has been described.

As having been explained above, in this embodiment, the recording magnetic domain of the recording layer 5 is independently magnified and transferred to the magnetic transfer layer 54 by the aid of the mask layer 52 so that the reproduced signal is detected from the magnetic transfer layer 54 having been subjected to the magnification and transfer. Therefore, it is possible to obtain the reproduced signal having a large amplitude as compared with a reproduced signal assumed to be detected from the recording layer 5. Further, the information can be reproduced by using the cheap MR head for detecting the in-plane magnetization. Therefore, it is possible to reduce the cost to produce the drive.

Fifth Embodiment

Next, explanation will be made for an embodiment in which information is reproduced by using an induction type magnetic head in place of the magnetic resistance element.

Figure 21:
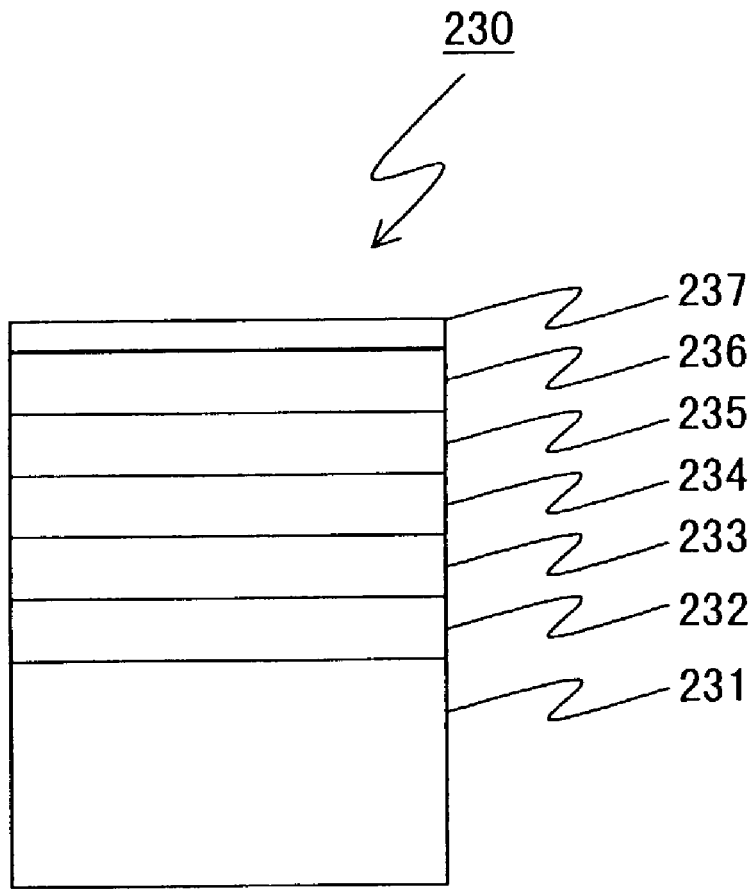
FIG. 21 shows a schematic sectional view illustrating a magneto-optical recording medium based on DWDD produced in the fifth embodiment.

This embodiment uses a magneto-optical recording medium which is a magneto-optical recording medium (hereinafter referred to as "DWDD medium") based on the system of DWDD (Domain Wall Displacement Detection). FIG. 21 shows a cross-sectional structure of the magneto-optical recording medium 230 based on DWDD. As shown in FIG. 21, The DWDD medium 230 has the structure comprising a protective layer 232, a memory layer (recording layer) 233, a switching layer 234, a displacement layer (reproducing layer) 235, a protective layer 236, and a lubricant layer 237 which are successively stacked on a substrate 231.

The substrate 231 is a polycarbonate substrate produced by the injection molding method. The substrate 231 is a land/groove type substrate including land and groove having a width of 0.6 μm. The protective layer 232, which is provided on the substrate 231, is composed of SiNx, and it has a film thickness of 60 nm. The memory layer 233 is a layer in which information is recorded, and it is composed of TbFeCoCr with a film thickness of 80 nm. The composition of TbFeCoCr was adjusted for the memory layer 233 so that the compensation temperature was about 80° C., and the Curie temperature was about 230° C.

The switching layer 234 is composed of TbFeCr, and its composition is adjusted so that the compensation temperature is about 50° C., and the Curie temperature is about 110° C. The switching layer 234 has a film thickness of 10 nm. The displacement layer 235 is composed of GdFeCr, and its composition is adjusted so that the compensation temperature is not more than the room temperature, and the Curie temperature is about 240° C. The displacement layer 235 has a film thickness of 30 nm. The protective layer 236 is composed of SiN, and it has a film thickness of 50 nm. The layers 232 to 236 are successively formed as films by using a sputtering apparatus. The lubricant layer 237, which is formed on the protective layer 236, comprises a lubricant composed of Fonbrine (product name). The lubricant layer 237 is formed by application by means of the spin coat method to give a film thickness of 2 mm.

The principle of the conventional reproducing method on the DWDD medium will now be briefly explained. Details of the principle of reproduction are described, for example, in "*Proceedings of Magneto-Optical Recording International Symposium '97*, J. Magn. Soc. Jpn., Vol. 22 Supplement No. S2 (1998), pp. 47–50". Therefore, reference may be made thereto.

Figure 22:
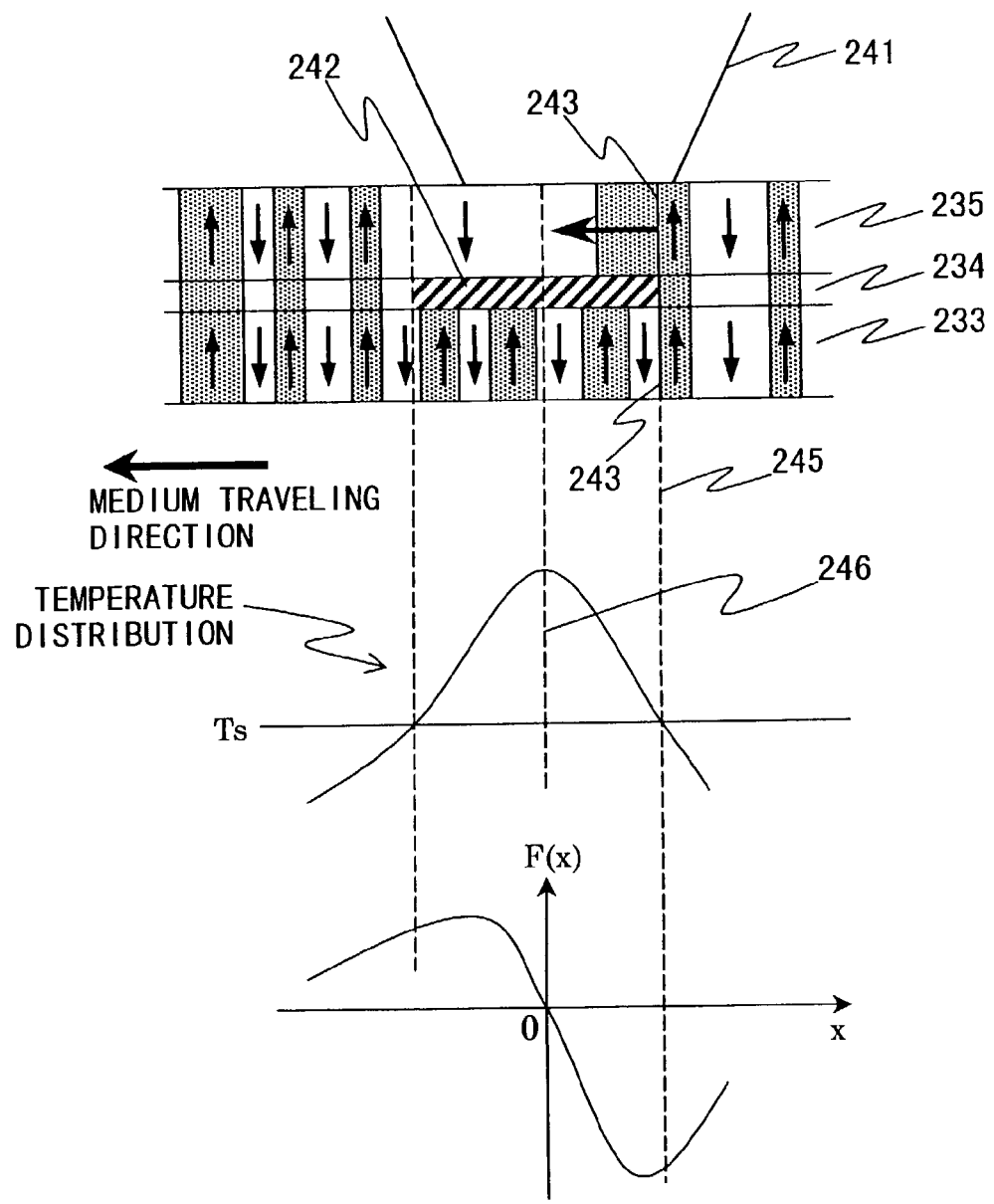
FIG. 22 illustrates the basic principle concerning a conventional reproducing method on the DWDD medium.

As shown in FIG. 22, when the laser beam 241 is radiated onto the DWDD medium, the DWDD medium is heated in accordance with the temperature distribution of the laser beam 241. The magnetization disappears in an area 242 which is heated to a temperature not less than the Curie temperature of the switching layer 234. Accordingly, the exchange coupling is disabled with respect to the displacement layer 235 and the memory layer 233 which are disposed at upper and lower positions thereof respectively. In the following description, the area 242 of the switching layer 234, in which the magnetization has disappeared, is referred to as "coupling-broken area". When the DWDD medium is scanned across the light spot, the domain wall 243 (boundary between the upward magnetic domain and the downward magnetic domain) passes across the front boundary 245 of the coupling-broken area 242. In general, the force applied to the domain wall depends on the domain wall energy density. The domain wall energy density is a function of temperature. Therefore, the force applied to the domain wall is generated by the temperature gradient around the domain wall. Accordingly, as shown in a graph in a lower part of FIG. 22, the force F(x) is generated for the domain wall 243 from the low temperature side to the high temperature side in the track direction provided that the rightward direction is positive. Therefore, the domain wall 243 of the displacement layer 235, which has lost the restraint of the exchange coupling force in the track direction, is moved by the force F(x) to the position 246 of the peak temperature of the temperature distribution in the light spot. The movement velocity of the domain wall 243 is faster than the movement velocity of the medium. Therefore, the magnetic domain of the displacement layer 235 disposed over the coupling-broken area 242 is magnified in the track direction. Accordingly, the reproduced signal, which is read from the displacement layer 235 in accordance with the magneto-optical effect (Kerr effect), has the amplitude which is greater than the amplitude of the reproduced signal obtained when the magnetic domain recorded in the memory layer 233 is directly read. In other words, even when the magnetic domain recorded in the memory layer 233 is minute, the magnetic domain can be reproduced with the amplified reproduced signal.

Figure 23:
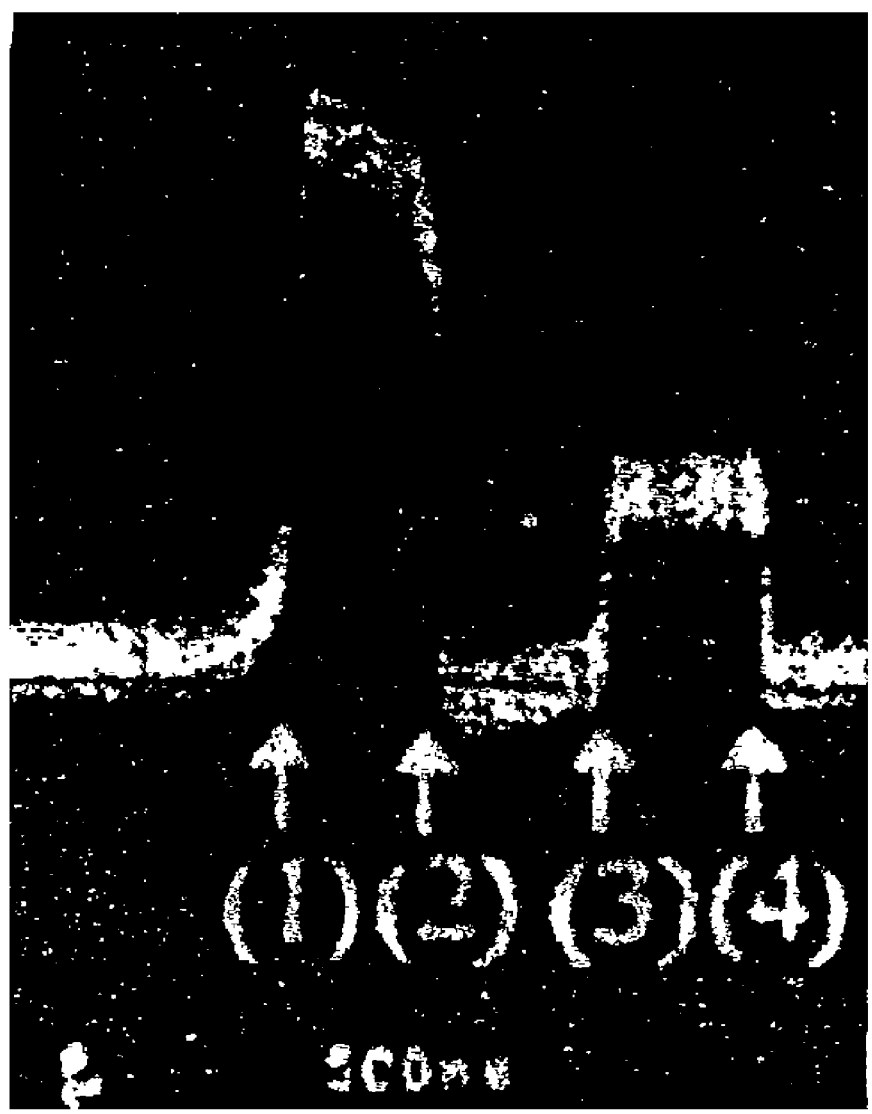
FIG. 23 shows a reproduction waveform obtained when a lone magnetic domain is subjected to the conventional magneto-optical reproduction, illustrating a situation in which two reproduction waves are observed.
Figure 24:
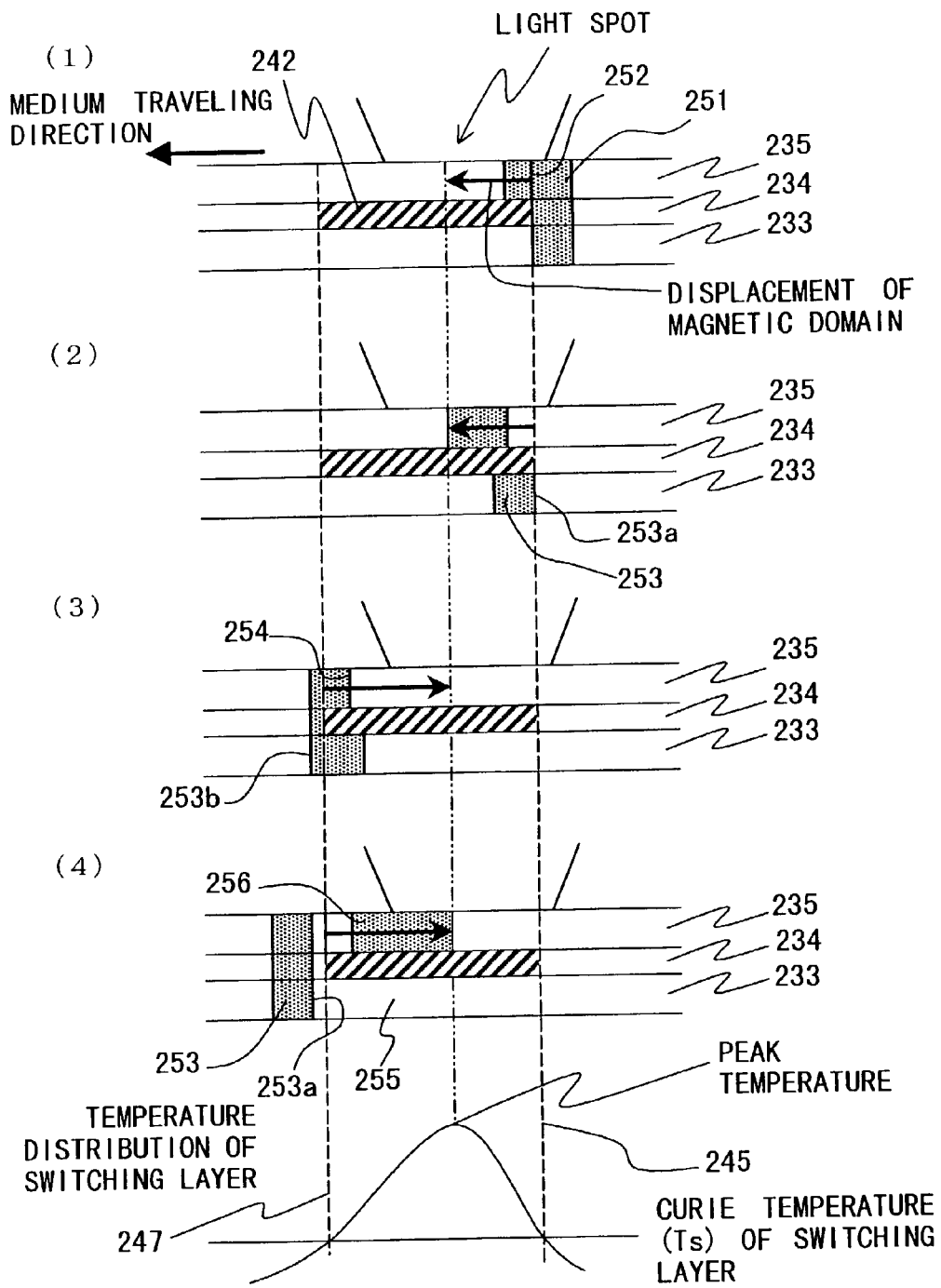
FIG. 24 illustrates the situations (1) to (4) of the reproduction waveform shown in FIG. 23.

When the lone magnetic domain recorded on the DWDD medium is magneto-optically reproduced in accordance with the conventional reproducing method, two reproduced waves are observed in an obtained waveform as shown in FIG. 23. The mechanism of this phenomenon will be explained with reference to FIGS. 23 and 24. Numerals (1) to (4) depicted in FIG. 23 correspond to numerals (1) to (4) depicted in FIG. 24 respectively. The situations of (1) to (4) will be briefly explained below. In the situation (1), when the left domain wall 252 of the lone magnetic domain (assumed to be an upward magnetic domain) 251 of the displacement layer 235 passes across the location of the front boundary 245 of the coupling-broken area 242, the domain wall 252 is moved in the displacement layer 235 toward the position of the peak temperature in the leftward direction in FIG. 24 in accordance with the principle described above. In the situation (2), when the DWDD medium is moved with respect to the light spot, and the right domain wall 253a of the lone magnetic domain 253 of the memory layer 233 passes across the location of the front boundary 245 of the coupling-broken area, then the domain wall 252 is moved in the displacement layer 235 in the leftward direction in FIG. 24 to the position of the peak temperature of the temperature distribution. In the situation (3), when the DWDD medium is further moved with respect to the light spot, the left domain wall 253b of the lone magnetic domain 253 of the memory layer 233 passes over the rear boundary 247 of the coupling-broken area. A part of the lone magnetic domain 253 of the memory layer 233, which corresponds to the past portion, is transferred by the exchange coupling to the displacement layer 235 in the left area of the coupling-broken area. The domain wall 254 in the displacement layer 235, which is disposed at the right of the rear boundary 247, is moved rightwardly toward the position of the peak temperature. In the situation (4), when the DWDD medium is further moved with respect to the light spot, the right domain wall 253a of the lone magnetic domain 253 of the memory layer 233 passes over the rear boundary 247 of the coupling-broken area. A part of the downward magnetic domain (indicated by a space) 255, which corresponds to the past portion, is transferred by the exchange coupling to the displacement layer 235 on the left side of the coupling-broken area. The domain wall 256 in the displacement layer 235, which has been located at the rear boundary 247, is moved rightwardly toward the peak temperature. The process described above suggests that two reproduced signals are observed for one lone magnetic domain to be read. With reference to FIG. 23, the reproduced signals indicated by (1) and (2) are reproduced signals to be read, while the reproduced signals indicated by (3) and (4) are reproduced signals not intended to be read. The reproduced signals indicated by (3) and (4) are called "ghost signal". It is not preferable that two reproduced signals are observed from one lone magnetic domain because of the following reason. That is, if the interval between magnetic domains is narrowed to achieve recording and reproduction at a higher density, it is difficult to make distinction individually for such reproduced signals. This embodiment has successfully avoid such a problem by performing the reproduction by using the induction type magnetic head as described below. Explanation will be made for a case in which information recorded on the DWDD medium is reproduced by using the induction type magnetic head.

Figure 25:
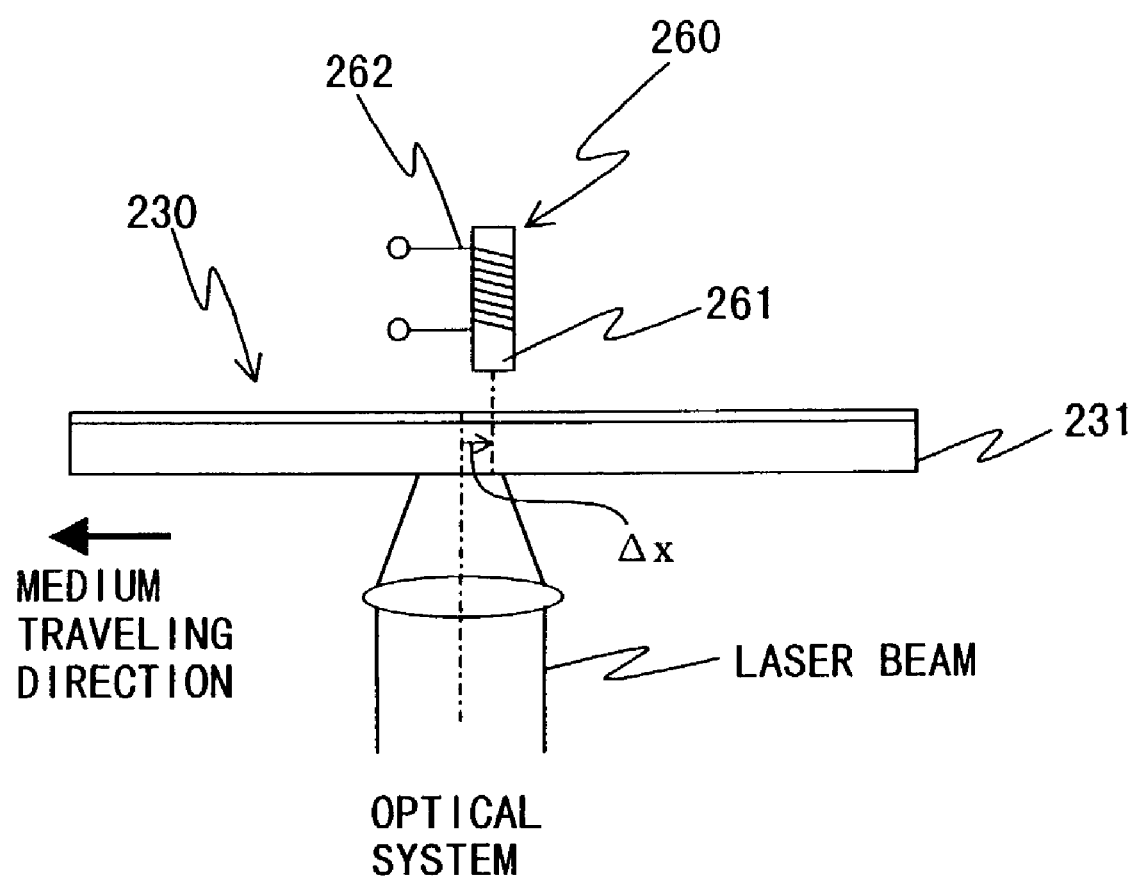
FIG. 25 conceptually shows an arrangement used to perform reproduction on the DWDD medium by using an induction type magnetic head.

FIG. 25 conceptually shows a situation in which the reproduction is performed on the DWDD medium by using the induction type magnetic head. As shown in FIG. 25, an optical system is arranged so that a laser beam comes into the side of the substrate 231 of the DWDD medium 230. An induction type magnetic head 260 is arranged at a position opposing to the optical system with the medium 230 interposed therebetween. The optical system includes a laser light source (not shown) for radiating the laser beam having a wavelength λ=680 nm, and an objective lens having a numerical aperture NA=0.55. Focusing and tracking servo can be performed by radiating the laser beam onto the medium and detecting reflected light from the medium.

The induction type magnetic head 260 is a single magnetic pole contact type magnetic head including a core 261 (magnetic core) and a coil 262. The core 261 is composed of, for example, permalloy. The portion of the core 261 to make contact with the medium is machined so that the size in the track widthwise direction is about 1.0 μm, and the length in the track direction (hereinafter referred to as "head length") is about 0.5 μm. The coil 262 is wound in a number of turns of 100. The induction type magnetic head 260 makes it possible to record magnetic domains in the memory layer by generating the recording magnetic field during the recording of information. When the information is reproduced, the change in leak magnetic field from the recording magnetic domain can be converted into an electric signal to reproduce the information by utilizing the electromotive force generated by electromagnetic induction.

Assuming that the number of turns of the coil is N, the magnetic flux is Φ, and the time is t, the reproduction output "e" of the induction type magnetic head 260 is represented by the following expression.

$$e = -N(d\Phi/dt)$$

This expression is further converted as follows.

$$e = -N(d\Phi(x)/dx)(dx/dt) = N(d\Phi/dx)v \quad (1)$$

In the expression (1), "v" represents the relative movement velocity (linear velocity) of the medium with respect to the induction type magnetic head.

Figure 26:
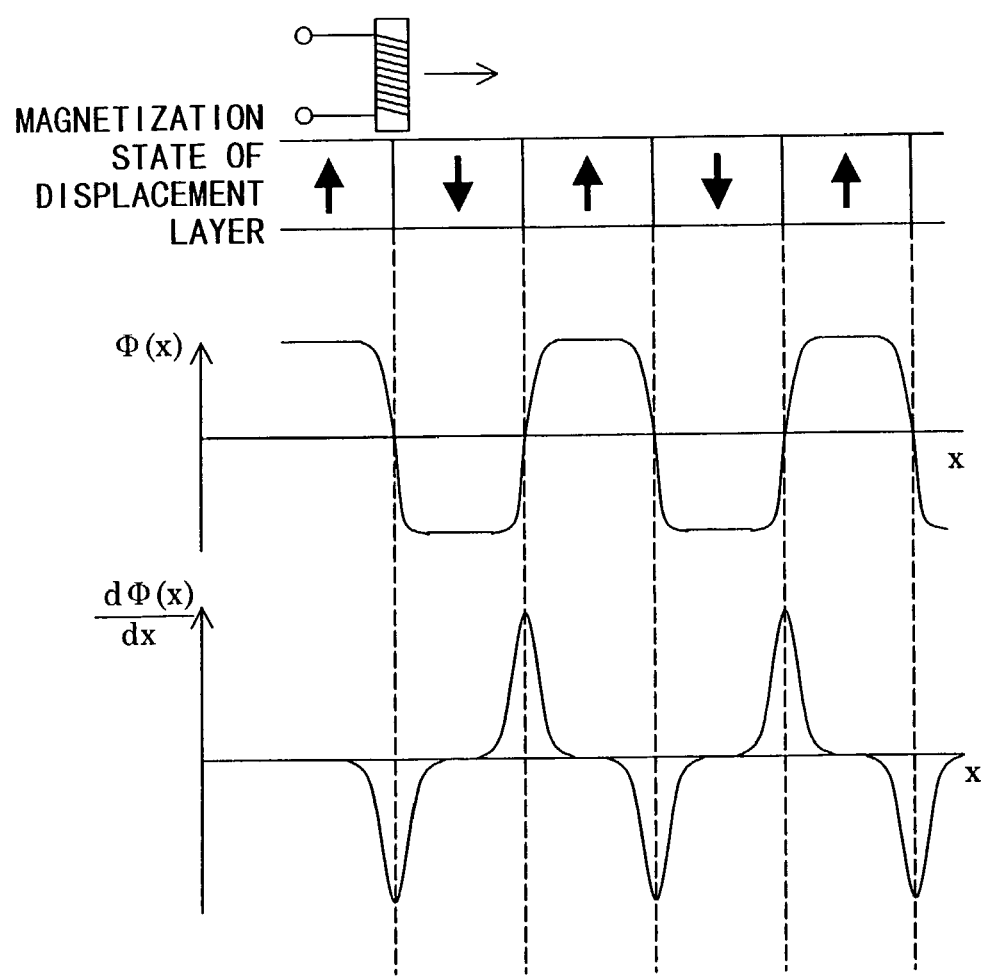
FIG. 26 shows the reproduced signal output and the distribution in the track direction of the magnetic flux $\Phi$ which traverses the coil of the induction type magnetic head concerning a case in which continuous magnetic domains are formed on the DWDD medium.

In this embodiment, it is assumed that the information is recorded on the land of the DWDD medium 230. The magnetism of the memory layer of the groove was deteriorated by annealing the memory layer of the groove in order to form the recording magnetic domain with the unclosed domain wall in the memory layer when the information was recorded. The annealing condition was as follows, i.e., the linear velocity v=1.5 m/s, and the annealing laser power Pa=10.0 mW. FIG. 26 shows, in its middle part, the distribution in the track direction of the magnetic flux Φ which traverses the coil of the induction type magnetic head, obtained when continuous magnetic domains are formed on the DWDD medium. The reproduced signal output, which is obtained when such continuous magnetic domains are reproduced, gives a waveform equivalent to the waveform shown in the lower part of FIG. 26, in accordance with the expression (1) described above.

Figure 27:
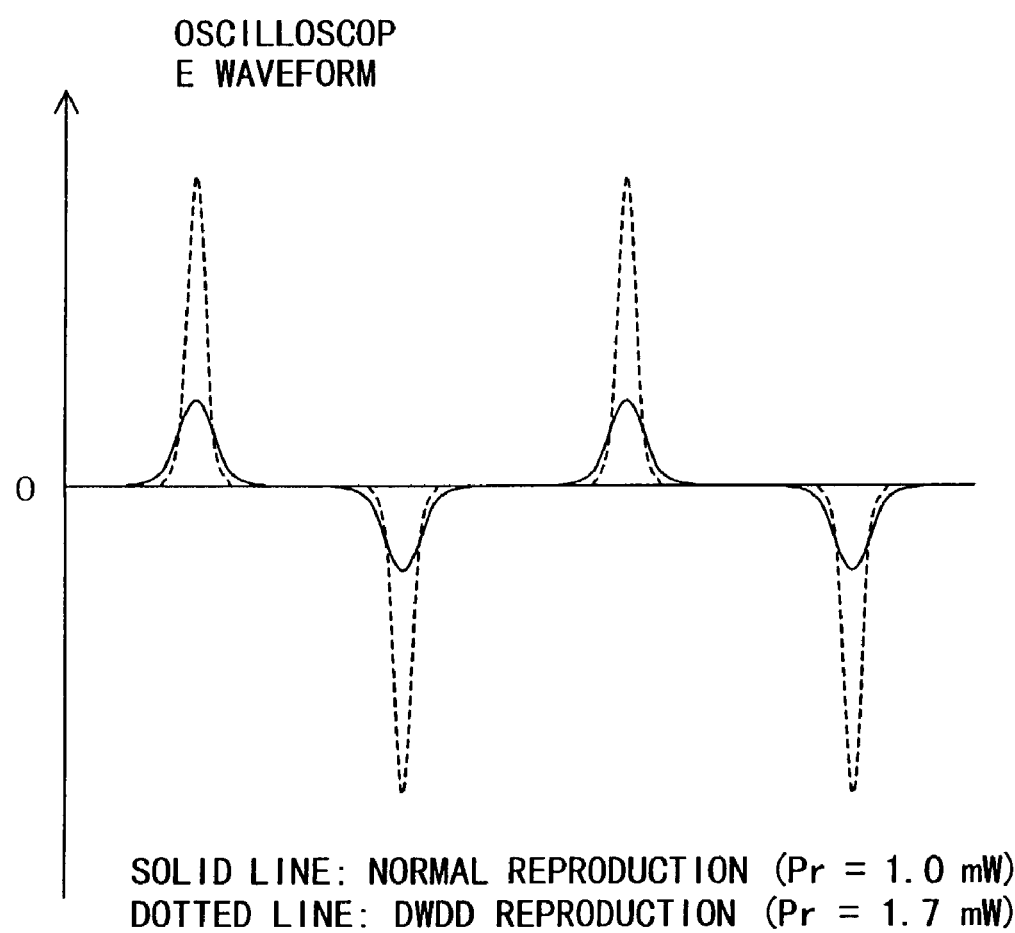
FIG. 27 shows a reproduction output obtained when the continuous magnetic domains are subjected to the normal reproduction, and a reproduction output obtained when the continuous magnetic domains are subjected to the DWDD reproduction.

Next, continuous magnetic domains of 0.8 μm were recorded on the DWDD medium 230 in accordance with the recording system based on the magnetic field modulation. The following recording condition was adopted, i.e., the linear velocity v=1.5 m/s, the recording power Pw=3.0 mW, and the recording magnetic field Hw=±400 Oe. The recording magnetic domains formed as described above were reproduced by using the induction type magnetic head while radiating the laser beam. FIG. 27 shows the reproduction output (Δx=0.2 μm). In FIG. 27, the solid line indicates the reproduction output obtained by the normal reproduction by using a reproducing laser power Pr=1.0 mW, and the dotted line indicates the reproduction output obtained by the DWDD reproduction by using a reproducing laser power Pr=1.7 mW. The normal reproduction refers to a reproducing method in which a magnetic domain of the memory layer is transferred to the displacement layer through the switching layer by means of a exchange-coupling without forming a coupling-cutting area, because the temperature of the switching layer is not more than the Curie temperature of the switching layer, and the information is reproduced from the displacement layer without displacement of the magnetic wall. The DWDD reproduction refers to a reproducing method in which a coupling-cutting area is formed in the switching layer and, as mentioned above, the information is reproduced from the displacement layer by the displacement of the magnetic wall within the displacement layer.

In the case of the normal reproduction, the parameter "v" in the foregoing expression (1) corresponds to a linear velocity of 1.5 m/s. On the other hand, in the case of the DWDD reproduction, the parameter "v", i.e., the domain wall displacement velocity is several tens times the above or more. Therefore, as shown in FIG. 27, in the DWDD reproduction, the reproduction output is large, and the half value width of the reproduced signal waveform is small, as compared with the normal reproduction. In view of the resolution in the track direction, this fact indicates that the DWDD reproduction, which is based on the use of the induction type magnetic head, is extremely effective as a method for reproducing information subjected to the high density recording.

Next, investigation was made for the situation of the change of the reproduced signal, caused by changing the relative position ($\Delta x$) of the core center of the induction type magnetic head with respect to the center of the light spot. FIG. 28 shows the dependency of the reproduction output on $\Delta x$, obtained when the lone magnetic domain of 0.8 µm was subjected to the DWDD reproduction. As shown in FIG. 28, the reproduced signal was observed by making the arrangement so that the center of the core of the induction type magnetic head was located at the position deviated by $\Delta x$ from the center of the light spot. It is assumed that the right side in FIG. 27 is positive, and the left side is negative. The ghost signal was observed in the case of $\Delta x = -0.2$ µm, namely when the core center was disposed leftwardly (rearwardly in the medium traveling direction) with respect to the center of the light spot. On the other hand, it is understood that the amplitude of the ghost signal is decreased, and it finally disappears sooner or later, as $\Delta x$ is increased, namely when the core center is disposed rightwardly (frontwardly in the medium traveling direction) with respect to the center of the light spot. In view of FIG. 22, this fact means that the ghost signal can be suppressed on condition that the core center of the magnetic head is disposed between the front boundary of the coupling-broken area and the peak temperature position.

In the DWDD reproduction, the domain wall displacement occurs in the displacement layer toward the position of the peak temperature, in the temperature distribution generated by radiating the laser beam. It is considered that the ghost signal was observed, because the peak temperature was located just under the core of the induction type magnetic head in the case of $\Delta x = -0.2$ µm to 0.1 µm. On the other hand, it is considered that the ghost signal is not observed in the case of $\Delta x \geq 0.2$ µm, because the peak temperature position goes out to the outside of the core.

As described above, the reproduction output, which was larger than that obtained by the normal reproduction, was successfully obtained by performing the reproduction (DWDD reproduction) on the DWDD medium by using the induction type magnetic head. Further, the decrease in resolution, which would be otherwise caused by the high density recording, was successfully suppressed. Furthermore, the ghost signal was successfully suppressed by making the head length of the core of the induction type magnetic head to be about the half of the light spot diameter, and by arranging the location of the core on the frontward side (the right side of FIG. 28) in the medium traveling direction with respect to the center of the light spot.

Thus, the present invention has been specifically explained above with reference to the drawings. However, it is needless to say that the present invention is not limited to the first to fifth embodiments described above, but the present invention includes modifications and improvements conceivable by those skilled in the art. For example, an underlying layer for controlling the magnetic anisotropy may be provided between the substrate 1 and the recording auxiliary layer 2 in the first and second embodiments described above, or between the substrate 1 and the recording holding layer 3 in the third and fourth embodiments described above.

The magnetic recording medium of the present invention comprises the recording layer which is constructed by using the ferri-magnetic material having the perpendicular magnetization, on which the information can be recorded at the super high density by applying the recording magnetic field while applying the heat to the predetermined area of the medium. The recording layer has the large coercive force which is not less than 5 kOe at the room temperature. Therefore, even when the minute recording mark is formed in the recording layer, the disappearance of the recording mark is prevented or suppressed, which would be otherwise caused by the thermomagnetic relaxation phenomenon.

According to the recording method on the magnetic recording medium of the present invention, the recording can be performed at the high density by using the magnetic head having the width of the magnetic pole of not more than 1 µm in the direction perpendicular to the recording direction, while applying the heat to the magnetic recording medium provided with the recording layer having the perpendicular magnetization. Therefore, the recording method is extremely preferred for the magnetic recording medium of the present invention.

According to the reproducing method on the magnetic recording medium of the present invention, the information, which is subjected to the perpendicular magnetic recording on the magnetic recording medium, can be reproduced by using the magnetic resistance element, the magnetic element having the spin-valve film, or the induction type magnetic element, while applying the heat to the magnetic recording medium. Therefore, the reproducing method is preferred for the magnetic recording medium of the present invention.

The recording and reproducing head of the present invention comprises the heat source for heating the magnetic recording medium, and the magnetic field-generating source and the magnetic element which are carried on the air slider. The information can be recorded at the high density by using the magnetic field-generating source carried on the air slider, while heating the magnetic recording medium by using the heat source. Those usable as the magnetic element include, for example, the magnetic resistance element, the magnetic element provided with the spin-valve film, and the induction type magnetic element. The information, which is recorded at the high density, can be reproduced by using the magnetic element as described above. Therefore, the recording and reproducing head is preferred for the magnetic recording medium of the present invention.

According to the recording method on the information-recording medium of the present invention, the recording mark, which is smaller than the light spot, can be formed in the area at the inside of the light spot, while projecting the light spot onto the information-recording medium comprising the recording layer having the perpendicular magnetization. Therefore, the recording method is extremely preferred for the super high density information-recording medium.

What is claimed is:

1. A recording and reproducing method for recording information on a magnetic recording medium having a recording layer on which the information is recorded and a reproducing layer from which recorded information is reproduced, on a substrate, the method comprising the step of:

recording the information by applying, to a predetermined area of the magnetic recording medium, a magnetic field in which at least one of intensity and polarity is modulated depending on the information to be recorded by using a magnetic head, while applying heat to the predetermined area, wherein the recording layer is composed of a ferri-magnetic material having perpendicular magnetization, the reproducing layer on the recording layer having a saturation magnetization which is larger than a saturation magnetization of the recording layer in a range of 20° C. to 150° C.; and a magnetic pole of magnetic head has a width of not more than 1 micron in a direction perpendicular to a recording direction.

2. The recording method of the magnetic recording medium according to claim 1, wherein light is radiated to apply the heat to the predetermined area of the magnetic recording medium.

3. The recording method of the magnetic recording medium according to claim 2, wherein an optical fiber is used to radiate the light.

4. The recording method of the magnetic recording medium according to claim 2, wherein the light is collected on a surface of the magnetic recording medium by an objective lens.

5. The recording method of the magnetic recording medium according to claim 1, wherein a heater is used to apply the heat to the predetermined area of the magnetic recording medium, and the heat from the heater is introduced by thermal conduction up to a position of not more than 1 μm from a surface of the magnetic recording medium.

6. The recording method of the magnetic recording medium according to claim 1, wherein the magnetic head is a single magnetic pole head.

7. The recording method of the magnetic recording medium according to claim 1, wherein a plurality of magnetic heads are used to simultaneously record a series of divided pieces of information at a plurality of positions on the magnetic recording medium respectively.

8. A method for recording information on a magnetic recording medium having a recording layer and a recording holding layer, a recording control layer, and reproducing information recorded thereon, comprising:
using a magnetic write head to record data in the recording layer, wherein
the recording layer is composed of a ferri-magnetic material having perpendicular magnetization, the recording holding layer is composed of an antiferromagnetic material, the recording control layer is composed of a ferri-magnetic material and is provided between the recording layer and the recording holding layer, and a Curie temperature of the recording control layer is not more than that of the recording layer; and
using a magnetic read head, which is selected from the group consisting of a magnetic resistance element, a magnetic element having a spin-valve film, and an induction type magnetic element to reproduce the information recorded in the recording layer.

9. The method according to claim 8, wherein the recorded information is recorded by applying a magnetic field in which at least one of intensity and polarity is modulated depending on the information to be recorded, while applying heat to a predetermined area of the magnetic recording medium.

10. The method according to claim 8, wherein:
the magnetic recording medium further comprises a reproducing layer on the recording layer, the reproducing layer having saturation magnetization which is larger than saturation magnetization of the recording layer in a temperature range of 20° C. to 150° C.; and
the information is reproduced by transferring magnetization of the recording layer to the reproducing layer by applying heat to an area of the magnetic recording medium subjected to the reproduction, and detecting the transferred magnetization of the reproducing layer by using the magnetic element.

11. The method according to claim 8, wherein a series of divided pieces of information are recorded at a plurality of positions on the magnetic recording medium respectively, and the respective pieces of information recorded at the plurality of positions are simultaneously reproduced by using a plurality of magnetic elements.

12. A recording method for recording information on an information-recording medium including, on a substrate, a recording layer having perpendicular magnetization, the method comprising the steps of:
irradiating the information recording medium with a light spot; and
applying a magnetic field to only an area which is located at the inside of the light spot and which is smaller than the light spot.

13. The recording method according to claim 12, wherein the magnetic field is applied to the area which is smaller than the light spot, by a single magnetic pole head.

14. A method for recording information on a magnetic recording medium and reproducing the information recorded thereon, comprising:
recording information on the magnetic recording medium including, on a substrate, a recording layer having perpendicular magnetization, a recording holding layer composed of an antiferromagnetic material and a recording control layer which is composed of a ferri-magnetic material and is provided between the recording layer and the recording holding layer, and a Curie temperature of the recording control layer is not more than that of the recording layer by applying, to a predetermined area of the magnetic recording medium, a magnetic field in which at least one of intensity and polarity is modulated depending on the information to be recorded, while applying heat to the predetermined area; and
reproducing the information recorded on the magnetic recording medium with a magnetic element selected from a group consisting of a magnetic resistance element, a magnetic element having a spin-valve film and an induction type magnetic element.

15. A method according to claim 14, wherein the heat is generated by irradiating a laser light onto the predetermined area.

16. A method according to claim 14, wherein the magnetic field for recording the information is generated by a magnetic field-generating source, and all of the magnetic field-generating source, the magnetic element and a heat source for the heat are arranged on a side of one surface of the magnetic recording medium.

17. A method according to claim 16, wherein all of the magnetic field-generating source, the magnetic element and the heat source are arranged on an air slider.

18. A method according to claim 14, wherein the recording layer is composed of a ferri-magnetic material.

19. A recording method for recording information on a magnetic recording medium having a recording layer, a recording holding layer, a reproducing layer and a recording control layer, on a substrate, the method comprising the step of:
recording the information by applying, to a predetermined area of the magnetic recording medium, a magnetic field in which at least one of intensity and polarity is modulated depending on the information to be recorded by using a magnetic head, while applying heat to the predetermined area, wherein the recording layer is composed of a ferri-magnetic material having perpendicular magnetization, and the recording holding layer is composed of an antiferromagnetic material, the reproducing layer on the recording layer having a saturation magnetization which is larger than a saturation magnetization of the recording layer in a range of 20° C. to 150° C., the recording control layer is composed of a ferri-magnetic material and is provided between the recording layer and the recording holding layer, and a Curie temperature of the recording control layer is not more than that of the recording layer; and a magnetic pole of the magnetic head has a width of not more than 1 micron in a direction perpendicular to a recording direction.

* * * * *